United States Patent
Cho et al.

(10) Patent No.: US 12,525,301 B2
(45) Date of Patent: Jan. 13, 2026

(54) MEMORY DEVICE AND METHOD FOR IMPROVING SENSING CHARACTERISTICS OF MEMORY CELLS

(71) Applicant: Samsung Electronics Co., Ltd., Suwon-si (KR)

(72) Inventors: Minji Cho, Suwon-si (KR); Jisang Lee, Suwon-si (KR); Sehwan Park, Suwon-si (KR); Jinyoung Kim, Suwon-si (KR); Joonsuc Jang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 211 days.

(21) Appl. No.: 18/470,931

(22) Filed: Sep. 20, 2023

(65) Prior Publication Data
US 2024/0221843 A1    Jul. 4, 2024

(30) Foreign Application Priority Data
Jan. 3, 2023   (KR) .................. 10-2023-0000900

(51) Int. Cl.
*G11C 16/26*   (2006.01)
*G11C 16/04*   (2006.01)
*G11C 16/08*   (2006.01)

(52) U.S. Cl.
CPC .......... *G11C 16/26* (2013.01); *G11C 16/0433* (2013.01); *G11C 16/08* (2013.01)

(58) Field of Classification Search
CPC ..... G11C 16/26; G11C 16/0433; G11C 16/08; G11C 11/5642; G11C 16/0483; G11C 16/3431; G06F 3/0658; G06F 3/0659
See application file for complete search history.

(56) References Cited

U.S. PATENT DOCUMENTS 8,441,856 B2   5/2013   Kim et al.
8,711,634 B2   4/2014   Futatsuyama et al.
(Continued)

FOREIGN PATENT DOCUMENTS

KR          101784973 B1   10/2017
KR    10-2018-0083689 A    7/2018

*Primary Examiner* — Amir Zarabian
*Assistant Examiner* — Bradley S Coon
(74) *Attorney, Agent, or Firm* — Harness, Dickey & Pierce, P.L.C.

(57) ABSTRACT

A method of operating a memory device including a memory cell array having a plurality of memory cells and a plurality of word lines connected to the plurality of memory cells. The method includes performing an additional read operation on the plurality of memory cells by adjusting a voltage level applied to a selected word line $WL_N$ connected to memory cells to be additionally read for improvements in memory cell sensing characteristics and a voltage level applied to a plurality of unselected word lines $WL_{Unselect}$, and performing a main read operation on the plurality of memory cells by adjusting a voltage level applied to at least one first word line among the plurality of unselected word lines $WL_{Unselect}$ to be different from a voltage level applied to the at least one first word line in the additional read operation.

20 Claims, 14 Drawing Sheets

(56) References Cited

U.S. PATENT DOCUMENTS

| | | | |
|---|---|---|---|
| 9,899,094 B2 | 2/2018 | Hong | |
| 10,163,518 B2 | 12/2018 | Yoon et al. | |
| 11,049,547 B1* | 6/2021 | Lee | G11C 16/28 |
| 11,342,040 B2 | 5/2022 | Yamaki et al. | |
| 11,462,280 B2 | 10/2022 | Muchherla et al. | |
| 2008/0219050 A1* | 9/2008 | Shalvi | G11C 27/005 |
| | | | 365/185.09 |
| 2013/0250691 A1 | 9/2013 | Kim et al. | |
| 2015/0071008 A1* | 3/2015 | Yang | G11C 16/0483 |
| | | | 365/185.23 |
| 2018/0090216 A1* | 3/2018 | Hahn | G11C 11/5671 |
| 2018/0204624 A1* | 7/2018 | Yoon | G11C 16/28 |
| 2022/0076762 A1 | 3/2022 | Lee et al. | |
| 2022/0270687 A1 | 8/2022 | Tokutomi et al. | |

* cited by examiner

FIG. 7

| WORD LINES | SELECTED OR UNSELECTED | VOLTAGES APPLIED IN ADDITIONAL READ | VOLTAGES APPLIED IN MAIN READ |
|---|---|---|---|
| ⋮ | $WL_{Unselect}$ | $V_{Unselect\_AR}$ | $V_{Unselect\_MR}$ |
| $WL_{N+3}$ | | | |
| $WL_{N+2}$ | | | |
| $WL_{N+1}$ | | | $V_{N+1\_MR}$ |
| $WL_N$ | $WL_{Select}$ | $V_{Select\_AR}$ | $V_{Select\_MR}$ |
| $WL_{N-1}$ | $WL_{Unselect}$ | $V_{Unselect\_AR}$ | $V_{N-1\_MR}$ |
| $WL_{N-2}$ | | | $V_{Unselect\_MR}$ |
| $WL_{N-3}$ | | | |
| ⋮ | | | |

MEMORY DEVICE AND METHOD FOR IMPROVING SENSING CHARACTERISTICS OF MEMORY CELLS

CROSS-REFERENCE TO RELATED APPLICATION

This application is based on and claims priority under 35 U.S.C. § 119 to Korean Patent Application No. 10-2023-0000900, filed on Jan. 3, 2023, in the Korean Intellectual Property Office, the disclosure of which is incorporated by reference herein in its entirety.

BACKGROUND

Example embodiments of inventive concepts relate to a memory device, and more particularly, to a memory device configured to change a read voltage and a voltage applied to adjacent word lines and/or a method of operating the memory device.

Semiconductor memory devices are implemented using semiconductors such as silicon (Si), germanium (Ge), gallium arsenide (GaAs), or indium phosphide (InP). Semiconductor memory devices may be generally classified into a volatile type and a nonvolatile type.

In addition, a multi-leveling technique for increasing the number of bits stored per cell and a scaling technique for reducing the line width of circuits have been used to improve the degree of integration of semiconductor devices and thus to satisfy the demand for high-capacity semiconductor memory devices. However, as the number of bits stored per cell increases, overlap between threshold voltage distributions increases, and as the line width of circuits decreases, coupling occurs due to a decrease in the distance between adjacent memory cells. Therefore, exact data reading based on an optimal read voltage is required.

SUMMARY

Example embodiments of inventive concepts provide a nonvolatile memory device configured to predict a threshold voltage distribution shift by adjusting the voltage of adjacent word lines during an additional read operation for improving sensing characteristics of memory cells and a main read operation, and a method of operating the memory device.

According to an embodiment of the present inventive concepts, there is provided a method of operating a memory device including a memory cell array. The memory cell array includes a plurality of memory cells and a plurality of word lines connected to the plurality of memory cells. The method includes performing an additional read operation on the plurality of memory cells by adjusting a voltage level applied to a selected word line $WL_N$ connected to memory cells to be additionally read for improvements in memory cell sensing characteristics and a voltage level applied to a plurality of unselected word lines $WL_{Unselect}$, and performing a main read operation on the plurality of memory cells by adjusting a voltage level applied to at least one first word line among the plurality of unselected word lines $WL_{Unselect}$ to be different from a voltage level applied to the at least one first word line in the additional read operation.

According to another embodiment of the present inventive concepts, there is provided a memory device including a memory cell array and control circuitry. The memory cell array includes a plurality of memory cells and a plurality of word lines connected to the plurality of memory cells. The control circuitry is configured to control the memory device such that the memory device performs an additional read operation on the plurality of memory cells by adjusting a voltage level applied to a selected word line $WL_N$ connected to memory cells to be additionally read for improvements in memory cell sensing characteristics and a voltage level applied to a plurality of unselected word lines $WL_{Unselect}$. The control circuitry is configured to control the memory device such that the memory device performs a main read operation on the plurality of memory cells by adjusting a voltage level applied to at least one first word line among the plurality of unselected word lines $WL_{Unselect}$ to be different from a voltage level applied to the at least one first word line in the additional read operation.

According to another embodiment of the present inventive concepts, there is provided a memory system including a memory device and a memory controller. The memory device includes a memory cell array and control circuitry. The memory cell array includes a plurality of memory cells and a plurality of word lines connected to the plurality of memory cells. The control circuitry is configured to control operations of a page buffer circuit and operations of a voltage generator. The memory controller is configured to transmit a command to the memory device to control an operation of the memory device. The memory device is configured to perform an additional read operation on the plurality of memory cells in response to the command by adjusting a voltage level applied to a selected word line $WL_N$ connected to memory cells to be additionally read for improvements in memory cell sensing characteristics and a voltage level applied to a plurality of unselected word lines $WL_{Unselect}$. The memory device is configured to perform a main read operation on the plurality of memory cells in response to the command by adjusting a voltage level applied to at least one first word line among the plurality of unselected word lines $WL_{Unselect}$ to be different from a voltage level applied to the at least one first word line in the additional read operation.

BRIEF DESCRIPTION OF THE DRAWINGS

Example embodiments will be more clearly understood from the following detailed description taken in conjunction with the accompanying drawings in which:

FIG. 7 is a diagram for describing a memory device according to an example embodiment;

DETAILED DESCRIPTION

Hereinafter, some example embodiments of inventive concepts will be described with reference to the accompanying drawings.

As described herein, an element that is "on" another element may be above or beneath or adjacent (e.g., horizontally adjacent) to the other element. An element that is on another element may be directly on the other element, such that the element is in direct contact with the other element. An element that is on another element may be indirectly on the other element, such that the element is isolated from direct contact with the other element by one or more interposing spaces and/or structures.

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

Figure 1:
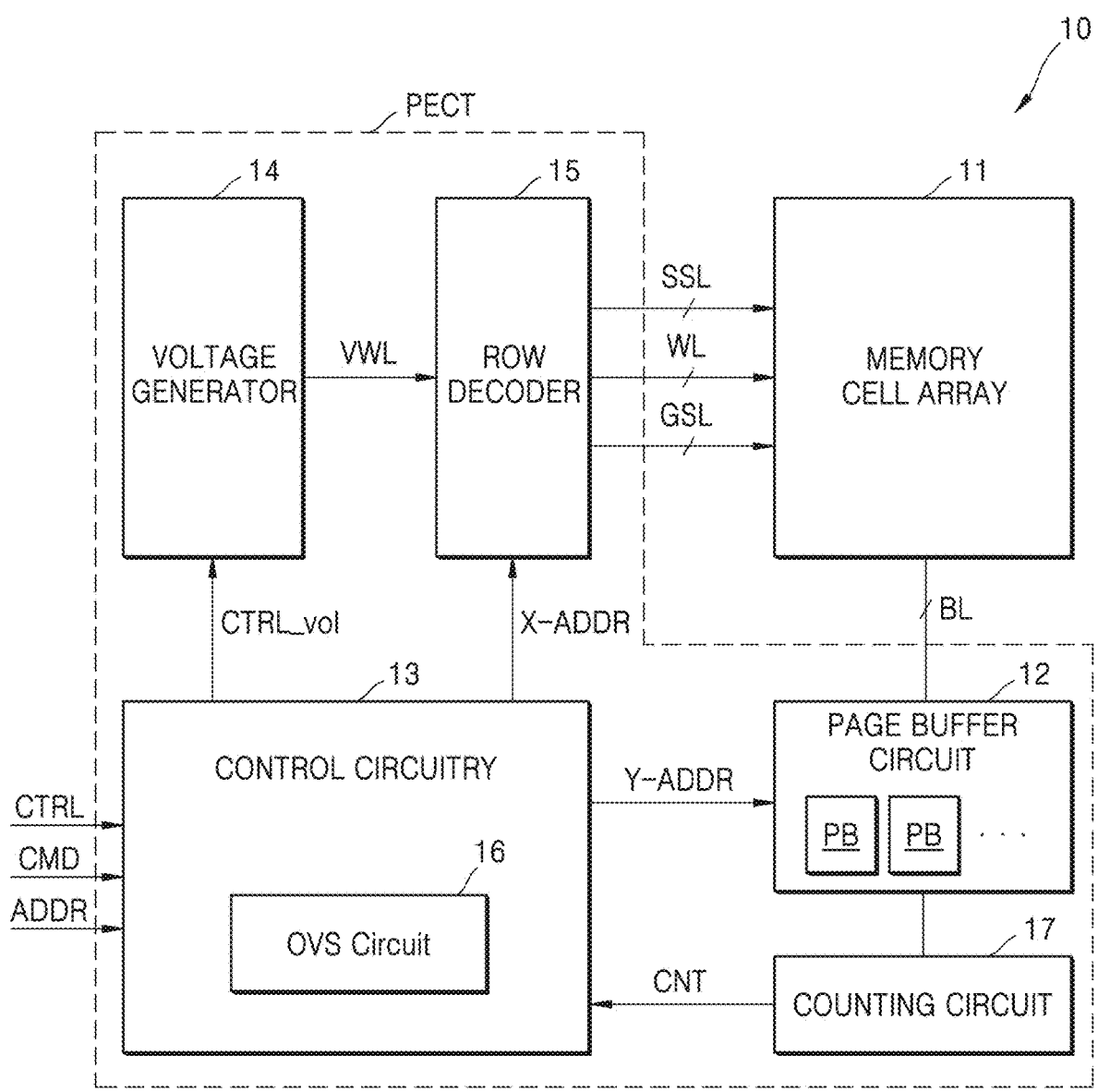
FIG. 1 is a block diagram illustrating a nonvolatile memory system according to an example embodiment.

FIG. 1 is a block diagram illustrating a nonvolatile memory system according to an example embodiment.

Referring to FIG. 1, a memory device 10 may include a memory cell array 11 and a peripheral circuit PECT. The peripheral circuit PECT may include a page buffer circuit 12, control circuitry 13, a voltage generator 14, a row decoder 15, an on-chip valley search (OVS) circuit 16, and a counting circuit 17. Although not shown in FIG. 1, the peripheral circuit PECT may further include a data input/output circuit or an input/output interface.

The memory cell array 11 is connected to the page buffer circuit 12 through bit lines BL and to the row decoder 15 through word lines WL, string select lines SSL, and ground select lines GSL. The memory cell array 11 may include memory cells, and the memory cells may be, for example, flash memory cells. Hereinafter, some example embodiments will be described for an example case in which the memory cells are NAND flash memory cells. However, inventive concepts are not limited thereto, and in some example embodiments, the memory cells may be resistive memory cells such as resistive random access memory (ReRAM) cells, phase change RAM (PRAM) cells, or magnetic RAM (MRAM) cells.

In an example embodiment, the memory cell array 11 may include a 3D memory cell array, wherein the 3D memory cell array may include a plurality of NAND strings, and each of the NAND strings may include memory cells that are respectively connected to the word lines WL vertically stacked on a substrate. U.S. Pat. Nos. 7,679,133, 8,553,466, 8,654,587, 8,559,235, and US Patent Application Publication No. 2011/0233648 disclose 3D memory array structures in which a 3D memory array has a plurality of levels that share word lines and/or bit lines with each other, and are incorporated herein by reference. However, inventive concepts are not limited thereto, and in some example embodiments, the memory cell array 11 may include a 2D memory cell array.

The page buffer circuit 12 may operate as a write driver or a sense amplifier. During a program operation, the page buffer circuit 12 may apply a bit line voltage corresponding to data to be programmed to the bit lines BL of the memory cell array 11. During a read operation or a verification read operation, the page buffer circuit 12 may sense data stored in a selected memory cell through a bit line BL. Each of a plurality of page buffers PB included in the page buffer circuit 12 may be connected to at least one bit line BL.

Each of the page buffers PB may perform sensing and latching for a main read operation and an additional read operation for improving sensing characteristics of the memory cells. That is, each of the page buffers PB may perform a plurality of sensing operations to identify any one state stored in selected memory cells under control by the control circuitry 13. In addition, each of the page buffers PB may store data sensed through a plurality of sensing operations, and may then select any one piece of data under control by the control circuitry 13. That is, each of the page buffers PB may perform sensing multiple times to identify any one state. In addition, each of the page buffers PB may select or output a piece of optimal data from among a plurality of sensed pieces of data under control by the control circuitry 13. A method for each of the page buffers PB to perform sensing and latching for an additional read operation and a main read operation will be described with reference to other drawings.

In an example embodiment, the page buffers PB may be arranged in a matrix form having a plurality of columns and a plurality of rows. In other words, the page buffers PB may be arranged in a plurality of multi-stage structures. In the description of the page buffer circuit 12, a row and a stage may be used having corresponding meaning to each other.

The control circuitry 13 may output various control signals, such as voltage control signals CTRL_vol, row addresses X-ADDR, and column addresses Y-ADDR, based on commands CMD, addresses ADDR, and control signals CTRL to program data into the memory cell array 11, read data from the memory cell array 11, or erase data stored in the memory cell array 11. In this manner, the control circuitry 13 may generally control various operations of the memory device 10. In addition, referring to FIG. 1, the control circuitry 13 may include the OVS circuit 16 (described later) therein. However, the control circuitry 13 is not limited thereto, and in some example embodiments, the OVS circuit 16 may be provided outside the control circuitry 13.

The voltage generator 14 may generate various types of voltages for performing program, read, and erase operations on the memory cell array 11 based on voltage control signals CTRL_vol. For example, the voltage generator 14 may generate a word line voltage VWL such as a program voltage, a read voltage, a pass voltage, an erase verify voltage or a program verify voltage, and may also generate a string select line voltage and a ground select line voltage.

In response to a row address X-ADDR, the row decoder 15 may select one of a plurality of memory blocks, one of word lines WL of the selected memory block, and one of a plurality of string select lines SSL. The page buffer circuit 12 may select some of the bit lines BL in response to a column address Y-ADDR. For example, the page buffer circuit 12 may operate as a write driver or a sense amplifier depending on operation modes.

The OVS circuit 16 may control the page buffer circuit 12 and the voltage generator 14 for an additional read operation including a valley search operation. Referring to FIG. 1, the control circuitry 13 may include the OVS circuit 16 (described later) therein. However, the control circuitry 13 is not limited thereto, and in some example embodiments, the OVS circuit 16 may be provided outside the control circuitry 13.

The OVS circuit 16 may control the page buffer circuit 12 to perform a plurality of sensing operations for identifying specific states of selected memory cells. In addition, the OVS circuit 16 may control the page buffers PB to store pieces of sensed data respectively corresponding to sensing results in a plurality of latch sets provided in each of the page buffers PB.

In addition, the OVS circuit 16 may perform a process of selecting optimal data from among pieces of sensed data. To select optimal data, the OVS circuit 16 may refer to counting results CNT provided from the counting circuit 17 (described later). The OVS circuit 16 may compare resultant values sensed through a plurality of sensing operations with each other to output, as read data, data sensed and latched with a valley voltage from among data stored in a plurality of latches.

That is, the OVS circuit 16 may control the page buffer circuit 12 to select a read result closest to a valley from among a plurality of sensing results and may output the selected read result. With reference to other drawings, a description will be given of how the OVS circuit 16 controls the page buffer circuit 12 to select a read result closest to a valley from among a plurality of sensing results and output the selected read result.

The counting circuit 17 may be implemented to count memory cells corresponding to a specific threshold voltage range by using data sensed by the page buffer circuit 12. For example, the counting circuit 17 may count the number of memory cells having a threshold voltage within a specific threshold voltage range by processing data sensed by each of the page buffers PB.

Furthermore, in an example embodiment, each of the memory cells included in the memory cell array 11 may store data of 2 bits or more. For example, each of the memory cells may be a multi-level cell (MLC) capable of storing 2-bit data. In another example, each of the memory cells may be a triple level cell (TLC) capable of storing 3-bit data or a quadruple level cell (QLC) capable of storing 4-bit data. However, example embodiments are not limited thereto. In other example embodiment, some of the memory cells included in the memory cell array 11 may be single level cells (SLCs) capable of storing 1-bit data, and the other memory cells may be MLCs.

Figure 2:
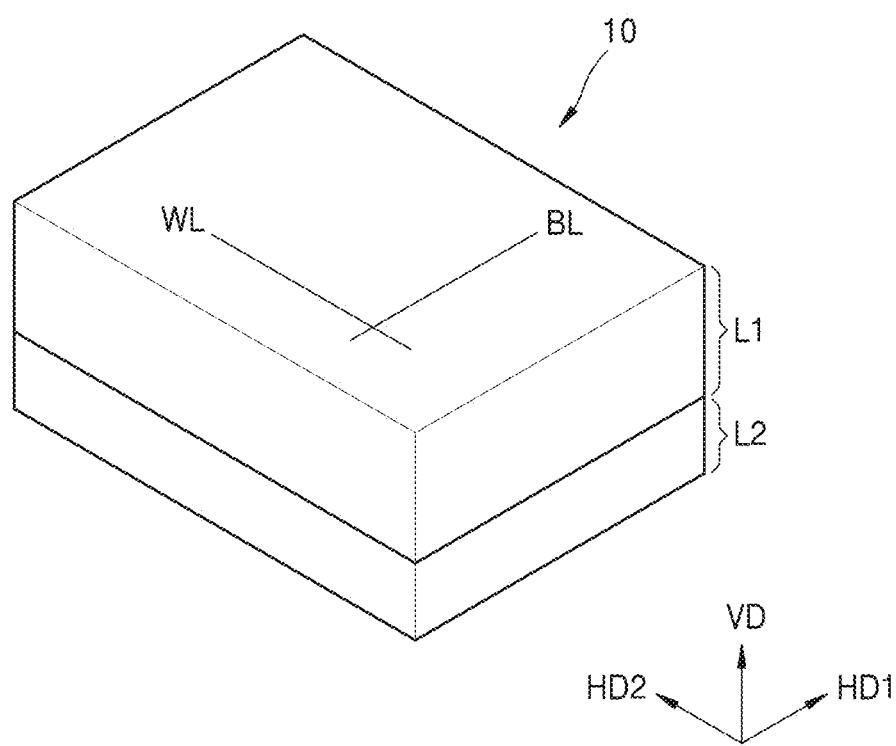
FIG. 2 is a diagram schematically illustrating a structure of a memory device shown in FIG. 1, according to an example embodiment.

FIG. 2 is a diagram schematically illustrating a structure of the memory device 10 shown in FIG. 1, according to an example embodiment.

Referring to FIG. 2, the memory device 10 may include a first semiconductor layer L1 and a second semiconductor layer L2, and the first semiconductor layer L1 may be disposed on the second semiconductor layer L2 in a vertical direction VD. For example, the second semiconductor layer L2 may be disposed under the first semiconductor layer L1 in the vertical direction VD, and thus, the second semiconductor layer L2 may be close to a substrate. In an example embodiment, the memory cell array 11 shown in FIG. 1 may be formed in the first semiconductor layer L1, and the peripheral circuit PECT shown in FIG. 1 may be formed in the second semiconductor layer L2. Therefore, the memory device 10 may have a structure in which the memory cell array 11 is disposed on the peripheral circuit PECT, that is, a cell-over-periphery (COP) structure. The COP structure may effectively reduce the area of the memory device 10 in a horizontal direction and improve the degree of integration of the memory device 10.

In an example embodiment, the second semiconductor layer L2 may include a substrate, and the peripheral circuit PECT may be formed in the second semiconductor layer L2 by forming transistors and transistor-wiring metal patterns on the substrate. After the peripheral circuit PECT is formed in the second semiconductor layer L2, the first semiconductor layer L1 including the memory cell array 11 may be formed, and metal patterns may be formed to electrically connect the word lines WL and the bit lines BL of the memory cell array 11 to the peripheral circuit PECT formed in the second semiconductor layer L2. For example, the bit lines BL may extend in a first horizontal direction HD1, and the word lines WL may extend in a second horizontal direction HD2.

As the number of stages of the memory cells of the memory cell array 11 increases owing to the development of semiconductor processes, that is, as the number of stacked word lines WL increases, the area of the memory cell array 11 may reduce, and thus, the area of the peripheral circuit PECT may also reduce. In the current example embodiment, the page buffer circuit 12 may have a structure in which page buffer units are separate from cache latches, thereby decreasing the area occupied by the page buffer circuit 12.

Figure 3:
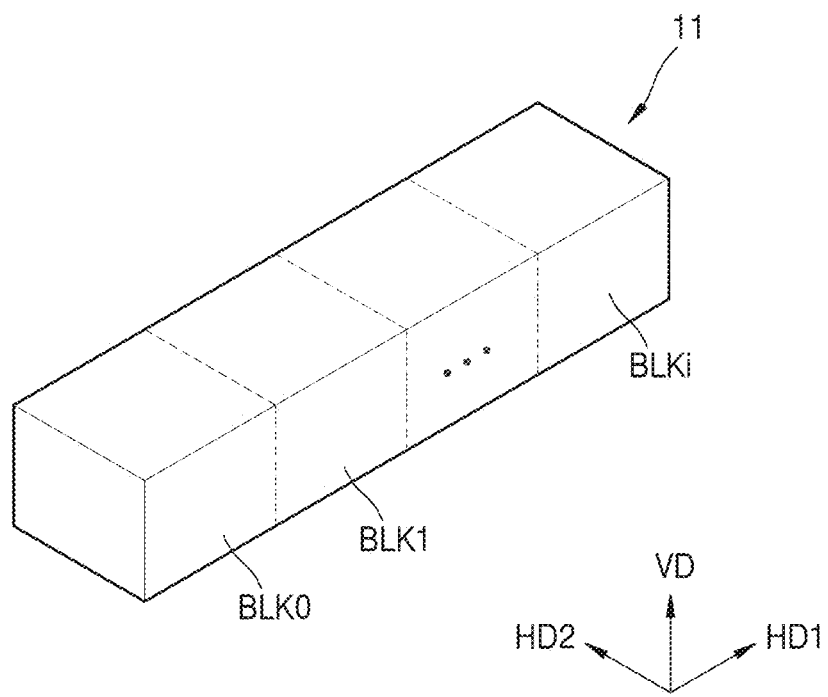
FIG. 3 is a diagram illustrating an example structure of a memory cell array shown in FIG. 1, according to an example embodiment.

FIG. 3 is a diagram illustrating an example structure of the memory cell array 11 shown in FIG. 1, according to an example embodiment.

Referring to FIG. 3, the memory cell array 11 may include memory blocks BLK0 to BLKi (i is a positive integer), and each of the memory blocks BLK0 to BLKi may have a 3D structure (or vertical structure). Each of the memory blocks BLK0 to BLKi may include a plurality of NAND strings extending in the vertical direction VD. The memory blocks BLK0 to BLKi may be selected by the row decoder 15 (refer to FIG. 1).

Figure 4:
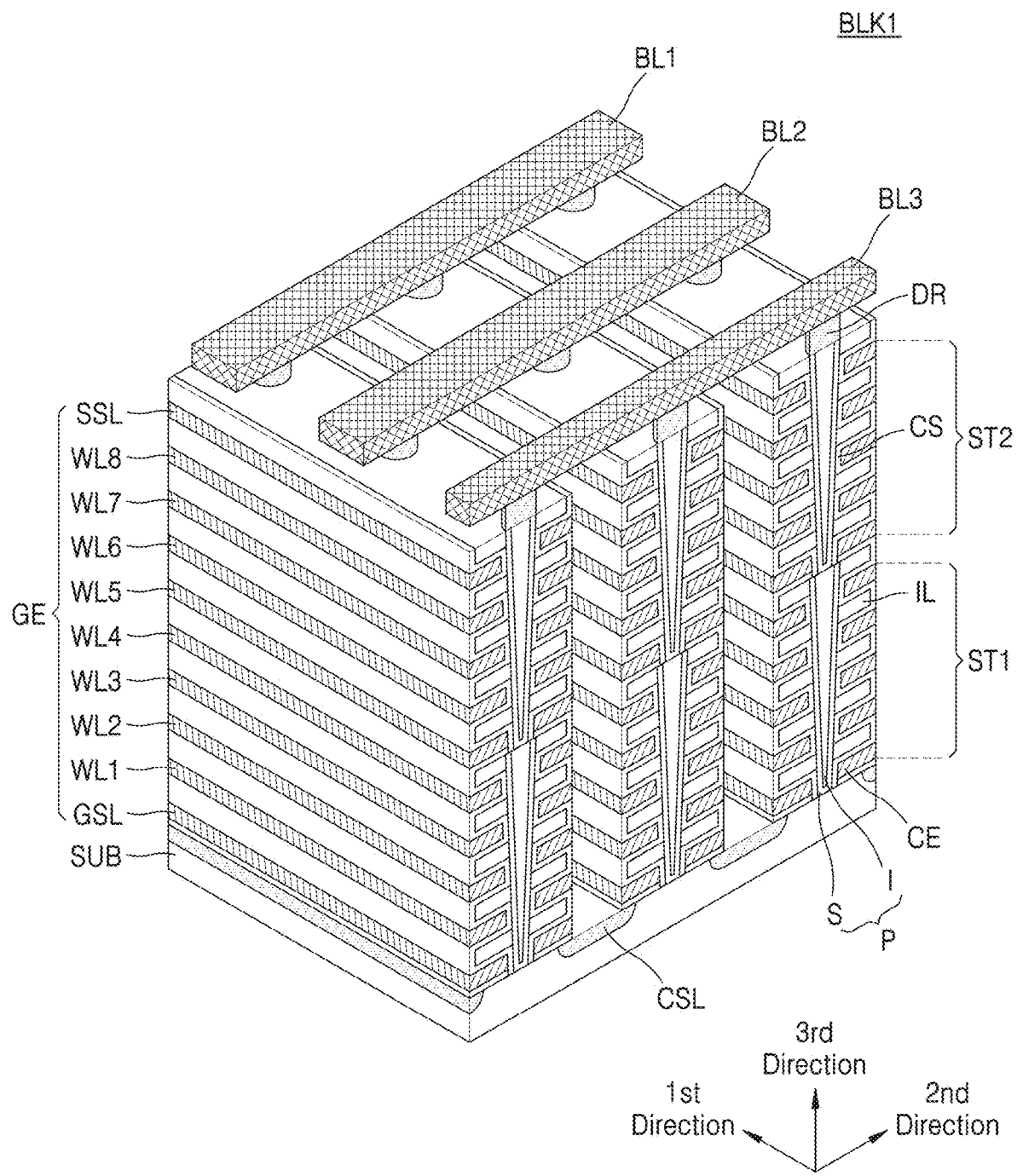
FIG. 4 is a perspective view illustrating a memory block according to an example embodiment.

FIG. 4 is a perspective view illustrating a memory block BLK1 according to an example embodiment.

Referring to FIG. 4, each memory block included in a memory cell array (for example, the memory cell array 11 shown in FIG. 1) may be formed in a direction perpendicular to a substrate SUB. FIG. 4 illustrates that the memory block BLK1 includes two select lines GSL and SSL, eight word lines WL1 to WL8, and three bit lines BL1 to BL3. However, the memory block BLK1 may include more or fewer lines than those shown in FIG. 4.

The substrate SUB has a first conductivity type (for example, p-type), and common source lines CSL doped with dopants having a second conductive type (for example, n-type) may extend on the substrate SUB in a first direction. The substrate SUB may be a bulk silicon substrate, a silicon-on-insulator (SOI) substrate, a germanium substrate, a germanium-on-insulator (GOI) substrate, a silicon-germanium substrate, or an epitaxial thin-film substrate obtained by selective epitaxial growth (SEG). The substrate SUB may include a semiconductor material. For example, the substrate SUB may include at least one of silicon (Si), germanium (Ge), silicon germanium (SiGe), gallium arsenide (GaAs), indium gallium arsenide (InGaAs), aluminum gallium arsenide (AlGaAs), or a mixture thereof, but is not limited thereto.

A first memory stack ST1 may be provided on the substrate SUB. For example, a plurality of insulating layers IL extending in the first direction are sequentially provided in a third direction on regions of the substrate SUB that are each between two adjacent common source lines CSL. The insulating layers IL are apart from each other by a specific distance in the third direction. For example, the insulating layers IL may include an insulating material such as silicon oxide. A plurality of pillars P sequentially aligned in the first direction and penetrating the insulating layers IL in the third direction are provided through an etching process on the regions of the substrate SUB that are each between two adjacent common source lines CSL. For example, the pillars P may penetrate the insulating layers IL and may be in contact with the substrate SUB. For example, a surface layer S of each of the pillars P may include a silicon material of the first conductive type and may function as a channel region. In addition, an inner layer I of each of the pillars P may include an insulating material such as silicon oxide or an air gap.

Charge storage layers CS are provided along the insulating layers IL, the pillars P, and an exposed surface of the substrate SUB on the regions of the substrate SUB that are each between two adjacent common source lines CSL. The charge storage layers CS may each include a gate insulating layer (also referred to as a 'tunneling insulating layer'), a charge trap layer, and a blocking insulating layer. For example, the charge storage layers CS may have an oxide-nitride-oxide (ONO) structure. In addition, gate electrodes GE such as the select lines GSL and SSL and the word lines WL1 to WL4 are provided on exposed surfaces of the charge trap layers CS on the regions of the substrate SUB that are each between two adjacent common source lines CSL.

The memory block BLK1 of the inventive concepts may further include a second memory stack ST2 formed on the first memory stack ST1 by the same method as the method of forming the first memory stack ST1. Drains DR or drain contacts are respectively provided on the pillars P extending into the second memory stack ST2. For example, the drains DR or drain contacts may include a silicon material doped with dopants of the second conductivity type. The bit lines BL1 to BL3, which extend in a second direction and are apart from each other by a specific distance in the first direction, are provided on the drains DR.

Figure 5:
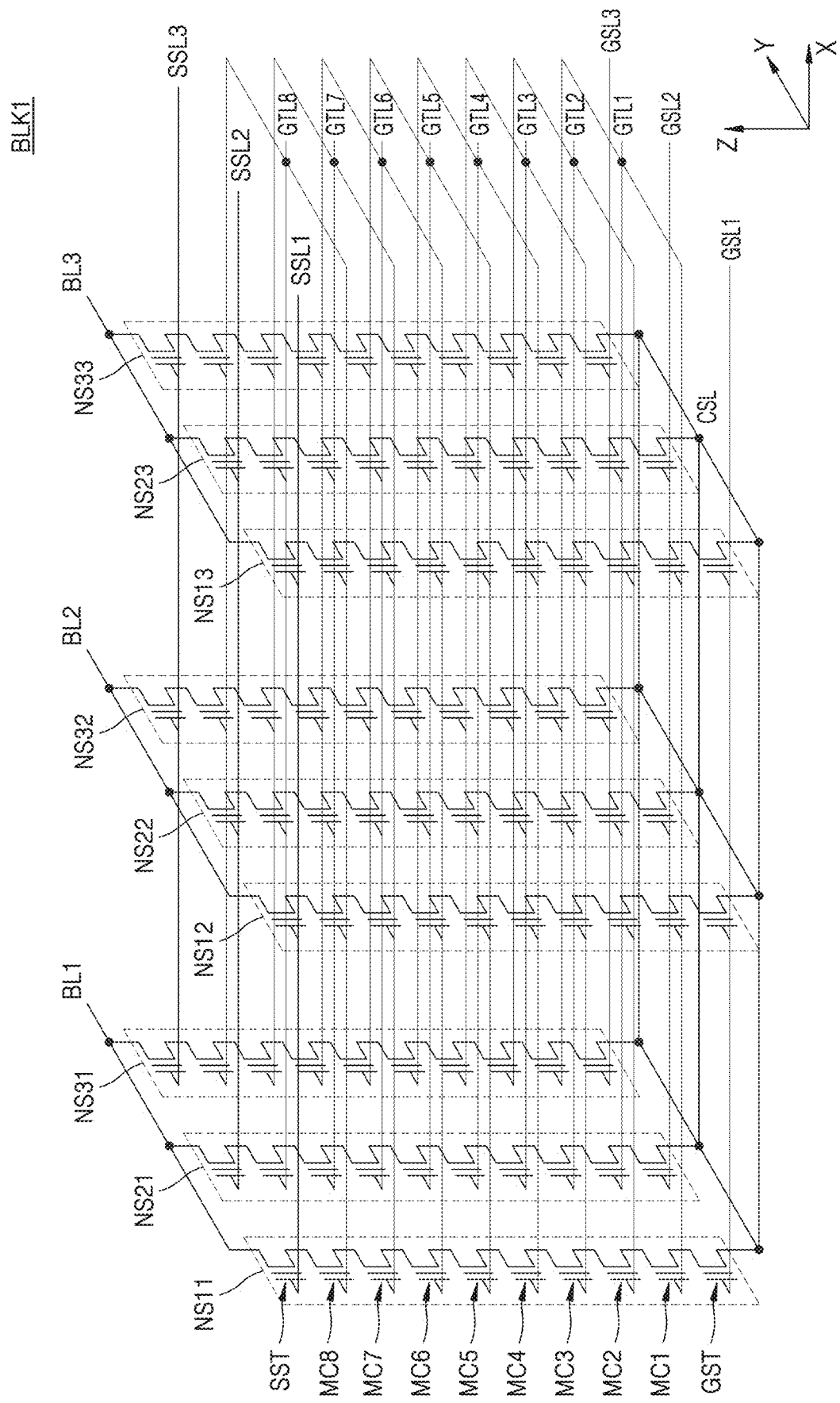
FIG. 5 is a circuit diagram illustrating an equivalent circuit of a first memory block among memory blocks according to an example embodiment.

FIG. 5 is a circuit diagram illustrating a circuit equivalent the memory block BLK1 (first memory block BLK1) among the memory blocks BLK1 to BLKi according to an example embodiment.

Referring to FIG. 5, the first memory block BLK1 may be a NAND flash memory having a vertical structure, and each of the memory blocks BLK1 to BLKi of the memory cell array 11 shown in FIG. 1 may be implemented as shown in FIG. 5. The first memory block BLK1 may include includes a plurality of NAND cell strings NS11 to NS33, a plurality of word lines WL1 to WL8, a plurality of bit lines BL1 to BL3, a plurality of ground select lines GSL1 to GSL3, a plurality of string select lines SSL1 to SSL3, and a common source line CSL. Here, the number of NAND cell strings, the number of word lines, the number of bit lines, the number of ground select lines, and the number of string select lines may be variously changed according to example embodiments.

The NAND cell strings NS11, NS21, and NS31 are provided between the bit line BL1 (first bit line BL1) and the common source line CSL, the NAND cell strings NS12, NS22, and NS32 are provided between the bit line BL2 (second bit line BL2) and the common source line CSL, and the NAND cell strings NS13, NS23, and NS33 are provided between the bit line BL3 (third bit line BL3) and the common source line CSL. Each NAND cell string (for example, the NAND cell string NS11) may include a string select transistor SST, a plurality of memory cells MC1 to MC8, and a ground select transistor GST that are connected in series to each other.

NAND cell strings commonly connected to one bit line may form one column. For example, the NAND cell strings NS11, NS21, and NS31 commonly connected to the first bit line BL1 may correspond to a first column, the NAND cell strings NS12, NS22, and NS32 commonly connected to the second bit line BL2 may correspond to a second column, and the NAND cell strings NS13, NS23, and NS33 commonly connected to the third bit line BL3 may correspond to a third column.

NAND cell strings connected to one string select line may form one row. For example, the NAND cell strings NS11, NS12, and NS13 connected to the string select line SSL1 (first string select line SSL1) may correspond to a first row, the NAND cell strings NS21, NS22, and NS23 connected to the string select line SSL2 (second string select line SSL2) may correspond to a second row, and the NAND cell strings NS31, NS32, and NS33 connected to the string select line SSL3 (third string select line SSL3) may correspond to a third row.

The string select transistors SST may be connected to the string select lines SSL1 to SSL3 corresponding to the string select transistors SST. The memory cells MC1 to MC8 may be connected to the word lines WL1 to WL8 corresponding to the memory cells MC1 to MC8. The ground select transistors GST may be connected to the ground select lines GSL1 to GSL3 corresponding to the ground select transistors GST, and the string select transistors SST may be connected to the bit lines BL1 to BL3 corresponding to the string select transistors SST. The ground select transistor GST may be connected to the common source line CSL.

In the current example embodiment, word lines provided at the same height are connected in common as a word line (for example, the word line WL1). The string select lines SSL1 to SSL3 are separate from each other, and the ground select lines GSL1 to GSL3 are also separate from each other. For example, when programming memory cells of the NAND cell strings NS11, NS12, and NS13 that are connected to the word line WL1 (first word line WL1) and correspond to the first row, the first word line WL1 and the first string select line SSL1 are selected. However, inventive concepts are not limited thereto, and in other example embodiments, the ground select lines GSL1 to GSL3 may be connected in common.

Figure 6:
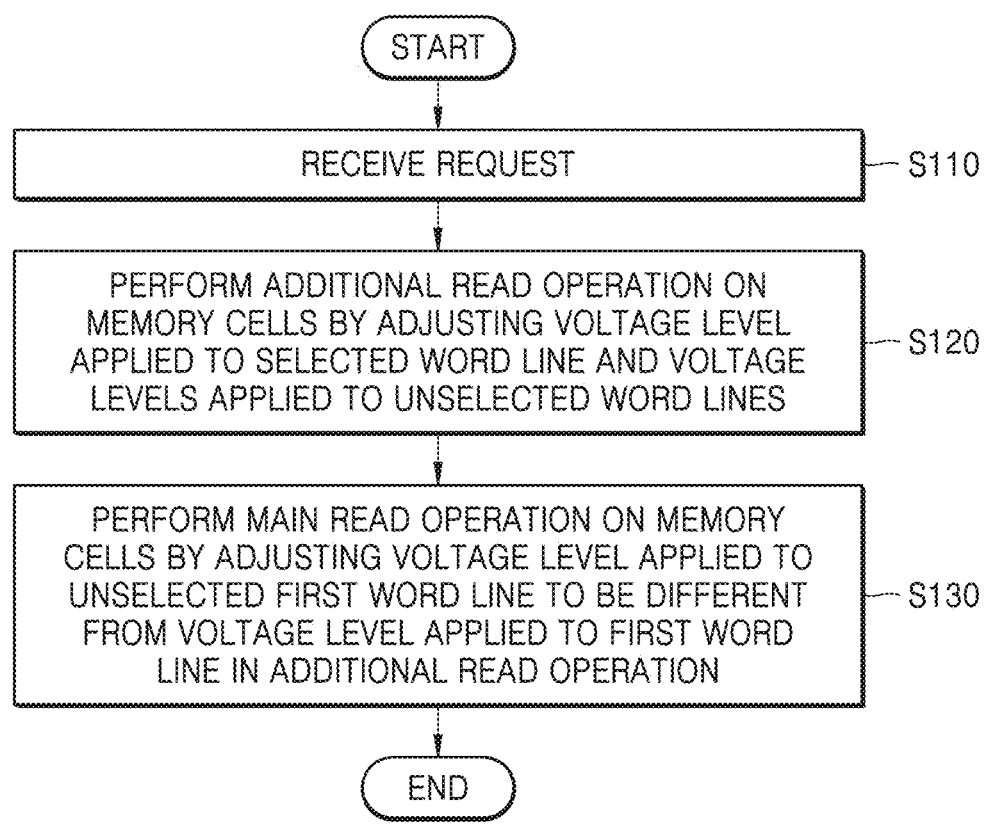
FIG. 6 is a flowchart illustrating a method of operating a memory device according to an example embodiment.

FIG. 6 is a flowchart illustrating a method of operating the memory device 10 according to an example embodiment.

The memory device 10 may perform a series of operations including: an additional read operation for improving sensing characteristics of the memory cells included in the memory device 10; and a main read operation.

Here, the main read operation is performed to determine turn-on or turn-off of memory cells according to a voltage level applied to selected word lines, and identify data stored in the memory cells. Information on error bits may be obtained through error correction code (ECC) decoding based on the identified data stored in the memory cells.

In addition, the additional read operation is performed on memory cells to improve sensing characteristics of the memory cells. The additional read operation may include an OVS operation, a read operation for obtaining distribution information by checking a distribution deterioration level, or the like. Hereinafter, the OVS operation will be described as an example of the additional read operation. However, example embodiments are not limited thereto. The memory device operating method of the inventive concepts may be applied to all types of read operations for improving sensing characteristics of memory cells.

First, the start point of the OVS operation of the memory device 10 will be described. The OVS operation refers to an algorithm for finding an optimal read level by quickly reading distribution data near a valley in a threshold voltage distribution. Hereafter, the OVS operation will also be referred to as a valley search operation.

First, for example, a description will be given on the assumption that the number of error bits is greater than or equal to a preset value when a read operation is performed on a specific memory block of the memory device 10.

The memory device 10 may reclaim data stored in the specific memory block and may move the data to another memory block. Alternatively, the memory device 10 may perform a default read operation (default RD) in response to a request from an external device. Here, the default RD may be a normal read operation or a history read operation. The default RD may refer to performing hard decision (HD) decoding by reading at a basic read level. Here, a decoding failure may lead to execution of a defense code, and in this case, valley search may be performed through a valley search operation.

In an example embodiment, each of the memory cells included in the memory cell array 11 may be a QLC capable of storing 4-bit data. Default RD may not be performed on QLCs, and the memory device 10 may perform a valley search operation in response to a request from an external device.

Referring to FIG. 6, in operation S110, the memory device 10 may receive a request. Here, the request may be for requesting the memory device 10 to perform an additional read operation. In addition, the additional read operation may include the valley search operation described above.

In addition, the memory device 10 may perform the additional read operation (for example, the valley search operation) for each memory cell connected to one word line among a plurality of memory cells connected to a plurality of word lines. That is, the memory device 10 may perform the additional read operation (for example, the valley search operation) in units of memory cells connected to one word line.

In an example embodiment, the counting circuit 17 may count a first number of memory cells included in a first threshold voltage range from results of a first sensing operation of a first group of page buffers PB, and a second number of memory cells included in a second threshold voltage range from results of a second sensing operation of a second group of page buffers PB. The counting circuit 17 may provide counting results CNT corresponding to the first number and the second number to the control circuitry 13. The control circuitry 13 or the OVS circuit 16 included in the control circuitry 13 may receive the counting results CNT corresponding to the first number and the second number, and may perform a valley search operation on a threshold voltage distribution of the memory cells by comparing the first number and the second number with each other. Here, example embodiments are not limited to the first group and the second group. For example, the memory device 10 may count the number of memory cells from results of a sensing operation of each of page buffers PB included in a plurality of groups, and may perform a valley search operation on a threshold voltage distribution of memory cells according to results of the counting.

Referring to FIG. 6, in operation S120, the memory device 10 may perform the additional read operation described above (for example, the valley search operation) by adjusting voltages respectively applied to a selected word line and a plurality of unselected word lines.

Prior to a further description, symbols defined as shown in FIG. 7 will now be described.

FIG. 7 is a diagram for describing a memory device according to an example embodiment.

Referring to FIG. 7, $WL_N$ refers to a selected word line connected to memory cells to be subjected to an additional read operation (for example, a valley search operation), $V_{Select\_AR}$ refers to a voltage level applied to the selected word line $WL_N$ during an additional read operation (for example, a valley search operation), and $V_{Select\_MR}$ refers to a voltage level applied to the selected word line $WL_N$ during a main read operation. In addition, $WL_{Unselect}$ refers to unselected word lines connected to memory cells that are not subjected to an additional read operation (for example, a valley search operation), and $V_{Unselect\_AR}$ refers to a voltage level applied to the unselected word lines $WL_{Unselect}$ during an additional read operation (for example, a valley search operation). In a main read operation after an additional read operation (for example, a valley search operation), $V_{N+1\_MR}$ refers to a voltage level applied to an upper word line $WL_{N+1}$ adjacent to an upper side of a selected word line among unselected word lines $WL_{Unselect}$, $V_{N-1\_MR}$ refers to a voltage level applied to a lower word line $WL_{N-1}$ adjacent to a lower side of the selected word line among the unselected word lines $WL_{Unselect}$, and $V_{Unselect\_MR}$ refers to a voltage level applied to the other unselected word lines.

Returning back to FIG. 6, in operation S120, the memory device 10 may perform an additional read operation (for example, a valley search operation) by adjusting a voltage applied to a selected word line $WL_N$ connected to memory cells to be improved in sensing characteristics by the additional read operation (for example, a valley search operation on a threshold voltage distribution) and voltages applied to a plurality of unselected word lines $WL_{Unselect}$.

In an example embodiment, the memory device 10 may perform the additional read operation (for example, the valley search operation) in such a manner that voltage levels $V_{Unselect\_AR}$ applied to the unselected word lines $WL_{Unselect}$ may be greater than a voltage level $V_{Select\_AR}$ applied to the selected word line $WL_N$ connected to the memory cells to be improved in sensing characteristics by the additional read operation (for example, the valley search operation regarding a threshold voltage distribution).

In addition, the control circuitry 13 or the OVS circuit 16 included in the control circuitry 13 may perform the valley search operation by controlling the page buffer circuit 12 and the voltage generator 14 such that that the voltage levels $V_{Unselect\_AR}$ applied to the unselected word lines $WL_{Unselect}$ may be greater than the voltage level $V_{Select\_AR}$ applied to the selected word line $WL_N$ connected to the memory cells to be subjected to the valley search operation on a threshold voltage distribution.

In this manner, the influence of a threshold voltage shift (Vth shift) caused by adjacent memory cells may be reduced, and thus, distribution characteristics of memory cells connected to a selected word line may be improved.

In addition, the memory device 10 may perform a main read operation by applying, to the selected word line $WL_N$, a second select voltage level $V_{Select\_MR}$ that is different from a first select voltage level $V_{Select\_AR}$ applied to the selected word line $WL_N$ during the additional read operation (for example, the valley search operation).

For example, the control circuitry 13 or the OVS circuit 16 included in the control circuitry 13 may perform the main read operation by controlling the page buffer circuit 12 and the voltage generator 14 to apply, to the selected word line $WL_N$, the second select voltage level $V_{Select\_MR}$ that is different from the first select voltage level $V_{Select\_AR}$ applied to the selected word line $WL_N$ during the additional read operation (for example, the valley search operation).

Referring to FIG. 6, in operation S130, the memory device 10 may perform the main read operation on memory cells in such a manner that a voltage level applied to at least one unselected first word line among the unselected word lines is different from a voltage level applied to the at least one unselected first word line during the additional read operation (for example, the valley search operation).

Figure 9:
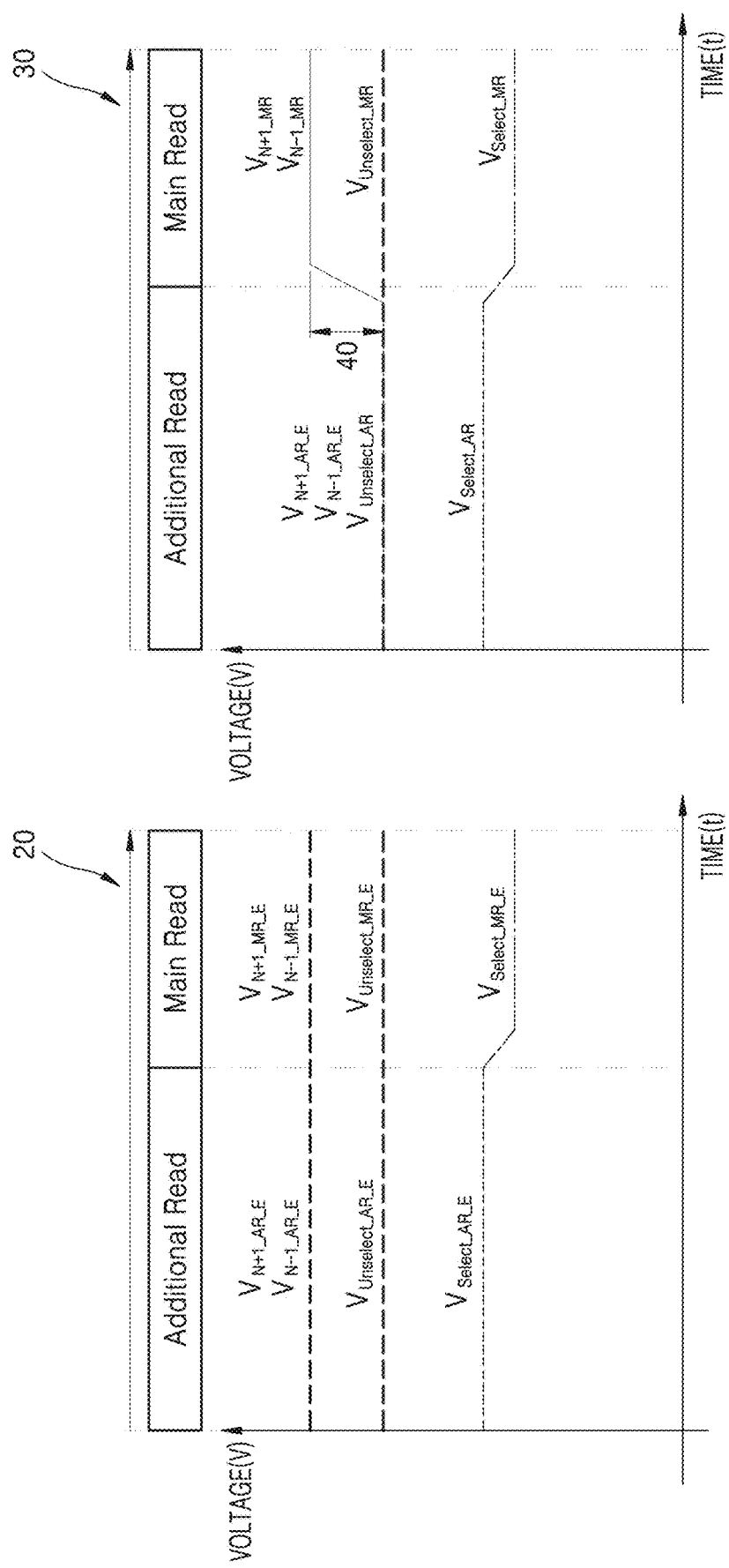
FIG. 9 is a diagram illustrating an operation of a memory device according to an example embodiment.
Figure 10:
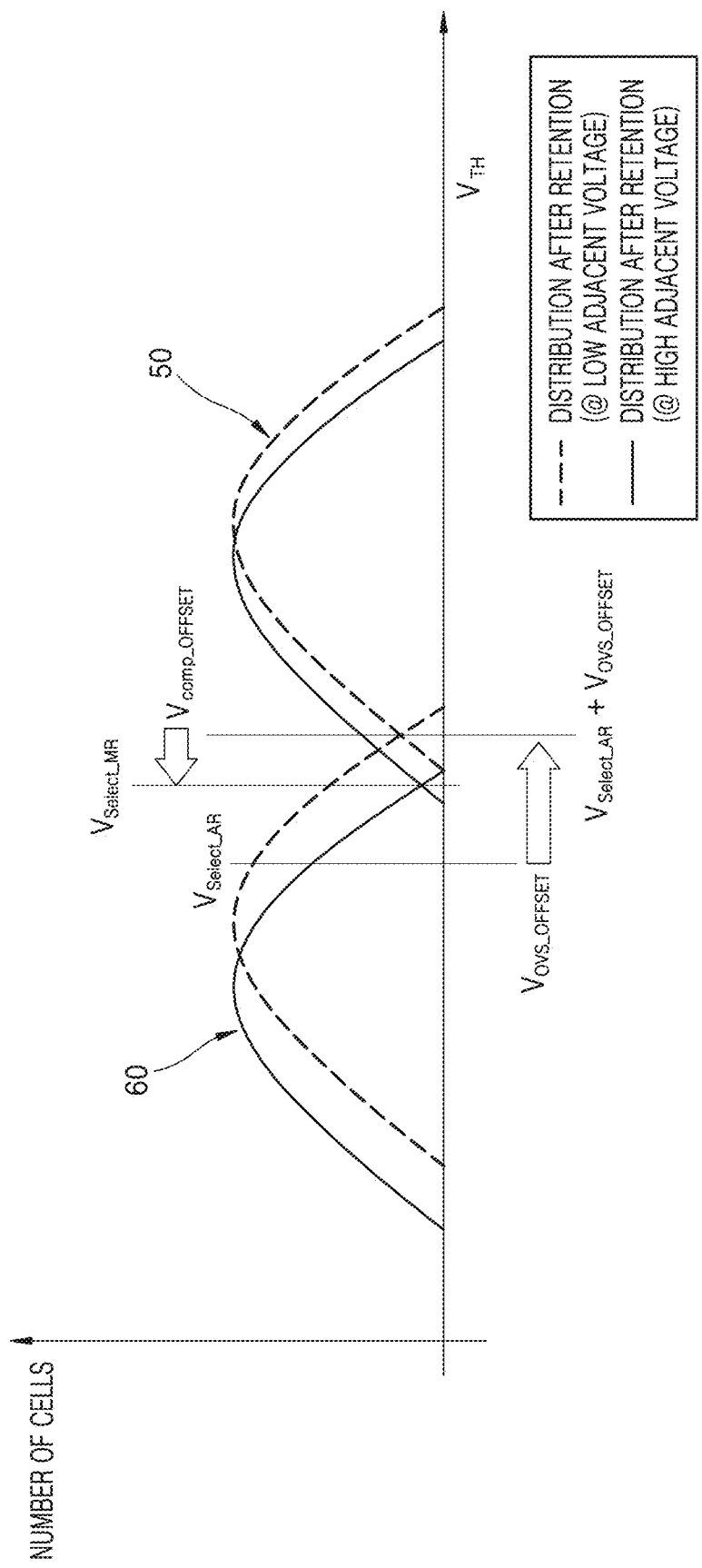
FIG. 10 is a diagram illustrating offsets according to an example embodiment.

In addition, the second select voltage level $V_{Select\_MR}$ may be determined based on an OVS offset voltage $V_{OVS\_OFFSET}$ and a compensation offset voltage $V_{comp\_OFFSET}$ that are determined by the valley search operation. With reference to FIGS. 9 and 10, a description will be given of a method of determining the second select voltage level $V_{Select\_MR}$ based on the OVS offset voltage $V_{OVS\_OFFSET}$ and the compensation offset voltage $V_{comp\_OFFSET}$ that are determined by the valley search operation.

In addition, the memory device 10 may perform the main read operation in such a manner that a voltage level $V_{N+1\_MR}$ applied to the upper word line $WL_{N+1}$ adjacent to the upper side of the selected word line $WL_N$ among the unselected word lines $WL_{Unselect}$ and a voltage level $V_{N-1\_MR}$ applied to the lower word line $WL_{N-1}$ adjacent to the lower side of the selected word line $WL_N$ among the unselected word lines $WL_{Unselect}$ are each different from a voltage level $V_{Unselect\_MR}$ that is applied to other unselected word lines $WL_{Unselect}$-$WL_{N+1}$-$WL_{N-1}$ except for the upper and lower word lines $WL_{N+1}$ and $WL_{N-1}$.

That is, the memory device 10 may perform the main read operation in such a manner that voltage levels of the upper and lower word lines $WL_{N+1}$ and $WL_{N-1}$ are different from voltage levels of the other unselected word lines $WL_{Unselect}$-$WL_{N+1}$-$WL_{N-1}$. In addition, the control circuitry 13 or the OVS circuit 16 included in the control circuitry 13 may perform the main read operation by controlling the page buffer circuit 12 and the voltage generator 14 in such a manner that the voltage level $V_{N+1\_MR}$ applied to the upper word line $WL_{N+1}$ adjacent to the upper side of the selected word line $WL_N$ among the unselected word lines $WL_{Unselect}$ and the voltage level $V_{N-1\_MR}$ applied to the lower word line $WL_{N-1}$ adjacent to the lower side of the selected word line $WL_{N+1}$ among the unselected word lines $WL_{Unselect}$ are each different from the voltage level $V_{Unselect\_MR}$ that is applied to the other unselected word lines $WL_{Unselect}$-$WL_{N+1}$-$WL_{N-1}$ except for the upper and lower word lines $WL_{N+1}$ and $WL_{N-1}$.

In an example embodiment, the memory device 10 may perform the main read operation in such a manner that the voltage level $V_{N+1\_MR}$ applied to the upper word line $WL_{N+1}$ and the voltage level $V_{N-1\_MR}$ applied to the lower word line $WL_{N-1}$ may each be greater than the voltage level $V_{Unselect\_MR}$ applied to the other unselected word lines $WL_{Unselect}$-$WL_{N+1}$-$WL_{N-1}$.

In addition, the memory device 10 may perform the additional read operation in such a manner that the voltage level $V_{N+1\_AR}$ applied to the upper word line $WL_{N+1}$ and the voltage level $V_{N-1\_AR}$ applied to the lower word line $WL_{N-1}$ during the additional read operation may respectively be lower than the voltage level $V_{N+1\_MR}$ applied to the upper word line $WL_{N+1}$ and the voltage level $V_{N-1\_MR}$ applied to the lower word line $WL_{N-1}$ during the main read operation.

That is, during the main read operation, the memory device 10 may perform the main read operation such that the voltage level $V_{N+1\_MR}$ applied to the upper word line $WL_{N+1}$ and the voltage level $V_{N-1\_MR}$ applied to the lower word line $WL_{N-1}$ during the main read operation may respectively be greater than the voltage level $V_{N+1\_AR}$ applied to the upper word line $WL_{N+1}$ and the voltage $V_{N-1\_AR}$ applied to the lower word line $WL_{N-1}$ during the additional read operation.

According to the present inventive concepts, in the additional read operation, the voltage levels $V_{N+1\_AR}$ and $V_{N-1\_AR}$ applied to the adjacent unselected word lines are lowered to the voltage level $V_{Unselect\_AR}$ applied to the unselected word lines, thereby limiting and/or preventing ReaD Disturb (RDD) deterioration caused by exposure to high voltage. In addition, variations in the position of an optimal valley that are caused by low adjacent voltages may be compensated for by using the compensation offset voltage $V_{comp\_OFFSET}$, thereby making it possible to find an optimal valley position while limiting and/or preventing RDD deterioration caused by exposure to high voltage.

Furthermore, in the main read operation, the voltage levels $V_{N+1\_MR}$ and $V_{N-1\_MR}$ of the adjacent word lines are adjusted to voltage levels $V_{N+1\_MR\_E}$ and $V_{N-1\_MR\_E}$ applied to adjacent unselected word lines in the comparative example of FIG. 9, and an optimal valley position variation caused by an adjacent voltage increasing as the voltage level of adjacent word lines varies between the additional read operation (for example, the valley search operation) and the main read operation may be compensated for by using the compensation offset voltage $V_{comp\_OFFSET}$, thereby making it possible to find an optimal valley position while limiting and/or preventing RDD deterioration caused by exposure to high voltage.

In addition, the memory device 10 may perform the main read operation in such a manner that a voltage level applied to the upper word line $WL_{N+1}$ disposed above the selected word line $WL_N$ among the unselected word lines is different from a voltage level applied to the lower word line $WL_{N-1}$ disposed under the selected word line $WL_N$ among the unselected word lines.

In addition, the memory device 10 may perform the main read operation in such a manner that a voltage level applied to a word line (one of the upper and lower word lines $WL_{N+1}$ and $WL_{N-1}$) disposed adjacent to the selected word line $WL_N$ among the unselected word lines $WL_{Unselect}$ may be different from a voltage level applied to unselected word lines $WL_{Unselect}$ other than the adjacent word line (one of the upper and lower word lines $WL_{N+1}$ and $WL_{N-1}$), that is, the other unselected word lines $WL_{Unselect}$-($WL_{N+1}$ or $WL_{N-1}$). Here, the adjacent word line may be one of the upper word line $WL_{N+1}$ and the lower word line $WL_{N-1}$.

In an example embodiment, the memory device 10 may perform the main read operation in such a manner that the voltage level (one of the voltage levels $V_{N+1\_MR}$ and $V_{N-1\_MR}$) applied to the adjacent word line (one of the upper and lower word lines $WL_{N+1}$ and $WL_{N-1}$) is greater than the voltage level $V_{Unselect\_MR}$ applied to the unselected word lines.

Figure 8:
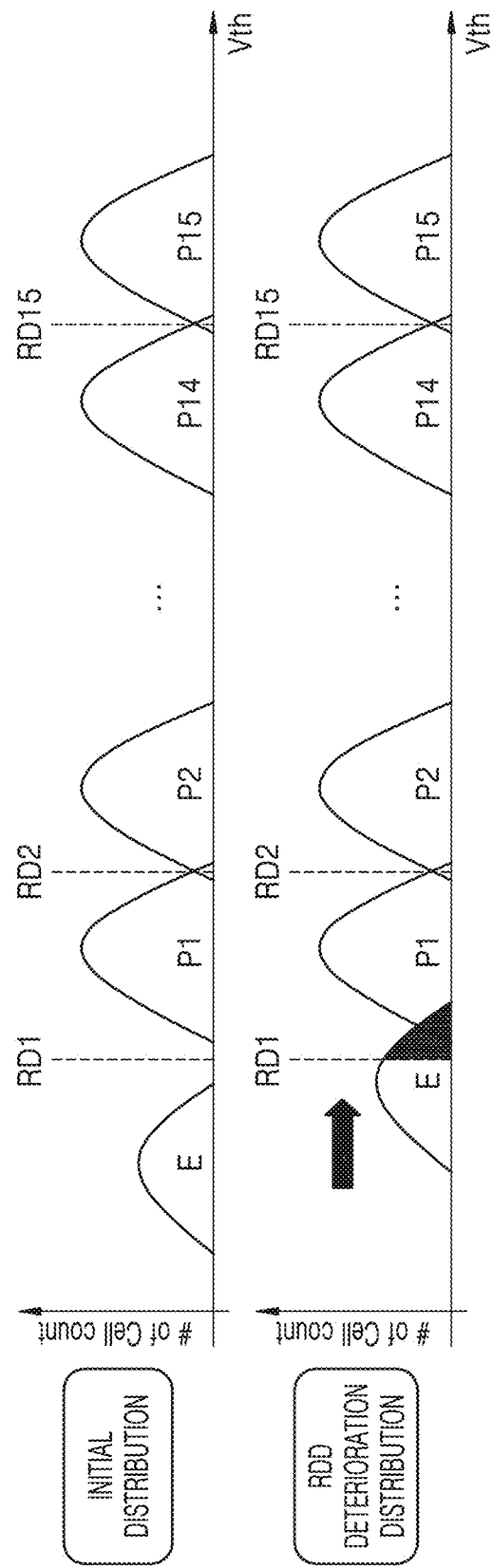
FIG. 8 is a diagram illustrating ReaD Disturb (RDD) deterioration according to an example embodiment.

FIG. 8 is a diagram illustrating RDD deterioration according to an example embodiment.

Referring to FIG. 8, an initial distribution and an RDD degradation distribution of QLC NAND memory cells are shown. That is, the initial distribution of the QLC NAND memory cells, and the distribution of the QLC NAND memory cells deteriorated by RDD are shown.

The QLC NAND memory cells may be programmed into a total of 16 states (erase state E, and first to fifteenth states P1 to P15), and the initial distribution of the QLC NAND memory cells may be ideal in each of the 16 as shown in FIG. 8.

However, after repetition of reading, an erase state distribution of the QLC NAND memory cells is shifted rightward relative to the initial distribution of the QLC NAND memory cells in proportion to the number of reads. This RDD deterioration increases in proportion to the number of reads and the level of voltage applied during reads.

The control circuitry 13 defines a distribution change shown with a shaded region in FIG. 8 as an error bit through ECC decoding. When the number of error bits is greater than a preset number, a corresponding memory block may be reclaimed to move data in the corresponding memory block to another memory block, thereby guaranteeing the reliability of memory cells.

As the degree of integration of memory cells increases, the distribution of selected memory cells deteriorates due to threshold voltages Vth of memory cells adjacent to memory cells connected to a selected word line. To limit and/or prevent this deterioration, a method of increasing a read voltage of the selected word line greater than a read voltage of unselected word lines may be used.

In this case, even after the same number of reads, memory cells connected to adjacent word lines are more vulnerable to RDD deterioration than memory cells connected to the selected word line. Thus, to improve the reliability of memory cells, the present inventive concepts adjust read voltages applied to adjacent word lines.

FIG. 9 is a diagram illustrating an operation of the memory device 10 according to an example embodiment.

Referring to FIG. 9, a graph 20 shows an additional read operation and a main read operation according to a comparative example, and a graph 30 shows an additional read operation and a main read operation according to an example embodiment. Here, each of the graphs 20 and 30 shows voltages applied to word lines with respect to time during the additional read operation and the main read operation. Here, the additional read operation may include an OVS operation, a read operation for obtaining distribution information by checking a distribution deterioration level, or the like. However, the additional read operation is not limited thereto and may include a read operation for improving sensing characteristics of memory cells.

Referring to FIG. 9, the additional read operation takes a longer time than the main read operation because the additional read operation includes bit line pre-charging or the like, that is, the additional read operation requires a set-up time for reading.

In addition, referring to the graph 20 showing the additional read operation and the main read operation of the comparative example, the same voltage level is applied to adjacent unselected word lines that are adjacent to a selected word line in the additional read operation and the main read operation, and the same voltage level is applied to unselected word lines other than the adjacent unselected word lines in the additional read operation and the main read operation. That is, a voltage level $V_{Unselect\_AR\_E}$ applied to the unselected word lines in the additional read operation is the same as a voltage level $V_{Unselect\_MR\_E}$ applied to the unselected word line in the main read operation, and voltage levels $V_{N+1\_AR\_E}$ and $V_{N-1\_AR\_E}$ applied to the adjacent unselected word lines in the additional read operation are the same as voltage levels $V_{N+1\_MR\_E}$ and $V_{N-1\_MR\_E}$ applied to the adjacent unselected word lines in the main read operation.

In addition, a more advantageous method of limiting and/or preventing RDD deterioration for the same number of reads is to reduce the voltage levels of the adjacent word lines in all of the additional read operation and the main read operation. However, this method results in distribution deterioration due to the influence of adjacent memory cells.

In this regard, the additional read operation and the main read operation will now be separately described with reference to the graph 30 showing the additional read operation and the main read operation according to an example embodiment.

Referring to FIG. 9, according to the present inventive concepts, the additional read operation is performed by reducing each of the voltage levels $V_{N+1\_AR}$ and $V_{N-1\_AR}$ applied to the adjacent unselected word lines $WL_{N+1}$ and $WL_{N-1}$ to the voltage level V Unselect_AR that is applied to the other unselected word lines $WL_{Unselect}$-$WL_{N+1}$-$WL_{N-1}$ except for the adjacent unselected word lines $WL_{N+1}$ and $WL_{N-1}$. That is, according to the present inventive concepts, the additional read operation is performed in such a manner that the voltage levels $V_{N+1\_AR}$ and $V_{N-1\_AR}$ applied to the adjacent unselected word lines $WL_{N+1}$ and $WL_{N-1}$ are respectively lower, by a present difference 40, than voltage levels $V_{N+1\_MR}$ and $V_{N-1\_MR}$ applied to the adjacent unselected word lines $WL_{N+1}$ and $WL_{N-1}$ in the main read operation.

Referring to FIG. 9, the main read operation is performed in such a manner that the voltage levels $V_{N+1\_MR}$ and $V_{N-1\_MR}$ applied to the adjacent unselected word lines $WL_{N+1}$ and $WL_{N-1}$ are increased to the voltage levels $V_{N+1\_MR}$ and $V_{N-1\_MR}$ applied to the adjacent unselected word lines $WL_{N+1}$ and $WL_{N-1}$ in the main read operation of the comparative example, and maintaining the voltage level $V_{Unselect\_MR}$ applied to the other unselected word lines $WL_{Unselect}$-$WL_{N+1}$-$WL_{N-1}$ to be the same as the voltage level $V_{Unselect\_AR}$ in the additional read operation.

In addition, when the additional read operation includes a valley search operation, a valley position may vary because the voltage levels applied to the adjacent unselected word lines are varied between the additional read operation and the main read operation. According to the present inventive concepts, variations in the position of a valley position may be compensated for by varying a voltage level applied as an offset.

In this regard, the voltage level $V_{Select\_MR}$ applied to the selected word line $WL_N$ in the main read operation after the additional read operation including the valley search operation may be determined as expressed by Equation 1 below.

$$V_{Select\_MR} = V_{Select\_AR} + V_{OVS\_OFFSET} + V_{comp\_OFFSET} \quad \text{[Equation 1]}$$

where $V_{Select\_AR}$ refers to a voltage level applied to the selected word line $WL_N$ during the valley search operation. $V_{OVS\_OFFSET}$ refers to an OVS offset voltage determined according to valley searching in the valley search operation, and $V_{comp\_OFFSET}$ refers to a compensation offset voltage.

In addition, the compensation offset voltage $V_{comp\_OFFSET}$ may be an offset voltage for compensating for a difference in the voltage levels applied to the adjacent unselected word lines between the additional read operation including the valley search operation and the main read operation.

In an example embodiment, the compensation offset voltage $V_{comp\_OFFSET}$ may be determined based on at least one of the positions of word lines, the distribution state of each threshold voltage, and pages to be read.

Here, the positions of word line refer to the positions of word lines to be searched, and for example, the compensation offset voltage $V_{comp\_OFFSET}$ may vary according to the positions of word lines such as a first word line, a second word line, and a third word line.

In addition, threshold voltage distribution states are classified according to logic states stored in memory cells. For example, QLCs may have the first to fifteenth states P1 to P15 and the erase state E, and the compensation offset voltage $V_{comp\_OFFSET}$ may vary according to the threshold voltage distribution states.

In addition, regarding pages to be read, when memory cells to be read are TLCs, the memory cells may be read according to three pages. Reading of a first page includes a first read operation on a first valley between the erase state E and the first state P1, and a second read operation on a fifth valley between the fourth state P4 and the fifth state P5. Reading of a second page includes a first read operation on a second valley between the first state P1 and the second state P2, a second read operation on a fourth valley between the third state P3 and the fourth state P4, and a third read operation on a sixth valley between the sixth state P6 and the seventh state P7. Reading of a third page includes a first read operation on a third valley between the second state P2 and the third state P3, and a second read operation on a seventh valley between the sixth state P6 and the seventh state P7. Therefore, the compensation offset voltage $V_{comp\_OFFSET}$ for TCLs may vary according to which of the three pages is read. That is, the compensation offset voltage $V_{comp\_OFFSET}$ may vary depending on which page is read from memory cells.

Example embodiments are not limited thereto. For example, at least one of the OVS offset voltage $V_{OVS\_OFFSET}$ and the compensation offset voltage $V_{comp\_OFFSET}$ may be a predetermined voltage or alternatively, may be a non-predetermined desired voltage.

According to the present inventive concepts, in the additional read operation (for example, the valley search operation), the voltage levels $V_{N+1\_AR}$ and $V_{N-1\_AR}$ applied to the adjacent unselected word lines are lowered to the voltage level $V_{Unselect\_AR}$ applied to the other unselected word lines, thereby limiting and/or preventing RDD deterioration caused by exposure to high voltage. In addition, optimal-valley-position variations that are caused by adjacent low voltages may be compensated for by the compensation offset voltage $V_{comp\_OFFSET}$, thereby making it possible to find an optimal valley position while limiting and/or preventing RDD deterioration caused by exposure to high voltage.

In addition, in the main read section, the voltage levels $V_{N+1\_MR}$ and $V_{N-1\_MR}$ of the adjacent unselected word lines are the same as the voltage levels $V_{N+1\_MR\_E}$ and $V_{N-1\_MR\_E}$ applied to the adjacent unselected word lines in the comparative example of FIG. 9, and optimal-valley-position variations caused by an increased adjacent voltage are compensated for by the compensation offset voltage $V_{comp\_OFFSET}$ determined according to the difference in the voltage levels of the adjacent unselected word lines between the additional read operation (for example, the valley search operation) and the main read operation, thereby making it possible to find an optimal valley position while limiting and/or preventing RDD deterioration caused by exposure to high voltage.

FIG. 10 is a diagram illustrating offsets according to an example embodiment.

FIG. 10 shows a memory cell distribution 50 that is present in an additional read operation before the voltage levels of adjacent unselected word lines are not increased, and a memory cell distribution 60 that is present in a main read operation after the voltage levels of the adjacent unselected word lines are increased. Here, the additional read operation may include an OVS operation, a read operation for obtaining distribution information by checking a distribution deterioration level, or the like. However, the additional read operation is not limited thereto and may include a read operation for improving sensing characteristics of memory cells.

First, referring to FIG. 10, the memory device 10 may determine an OVS offset voltage $V_{OVS\_OFFSET}$ by performing a valley search operation on the memory cell distribution 50 in the additional read operation before the voltage levels of adjacent unselected word lines are not increased.

Thereafter, the memory device 10 may perform the main read operation by increasing the voltage levels $V_{N+1\_MR}$ and $V_{N-1\_MR}$ of the adjacent unselected word lines to the voltage levels $V_{N+1\_MR\_E}$ and $V_{N-1\_MR\_E}$ that are applied to the adjacent unselected word lines in a main read operation according to the comparative example described in FIG. 9, and determining, based on the determined OVS offset voltage $V_{OVS\_OFFSET}$ and a compensation offset voltage $V_{comp\_OFFSET}$, a voltage level $V_{Select\_MR}$ applied to the selected word line.

In an example embodiment, as in Equation 1 described with reference to FIG. 9, the voltage level $V_{Select\_MR}$ applied to the selected word line in a normal lead operation may be the sum of the voltage level $V_{Select\_AR}$ applied to the selected word line in the additional read operation including the valley search operation, the OVS offset voltage $V_{OVS\_OFFSET}$ determined according to a valley found in the valley search operation, and the compensation offset voltage $V_{comp\_OFFSET}$. Referring to the example shown in FIG. 10, the distribution of memory cells is shifted to the left when the voltage levels of the adjacent word lines are increased. In this case, the voltage level $V_{Select\_OVS}+V_{OVS\_OFFSET}$ found by the valley search operation is not a read voltage level corresponding to an optimal valley, and thus, a read voltage level $V_{Select\_OVS}+V_{OVS\_OFFSET}+V_{comp\_OFFSET}$ corresponding to an optimal valley may be found by adding the compensation voltage level $V_{comp\_OFFSET}$ to the voltage level $V_{Select\_OVS}+V_{OVS\_OFFSET}$ found by the valley search operation.

Figure 11:
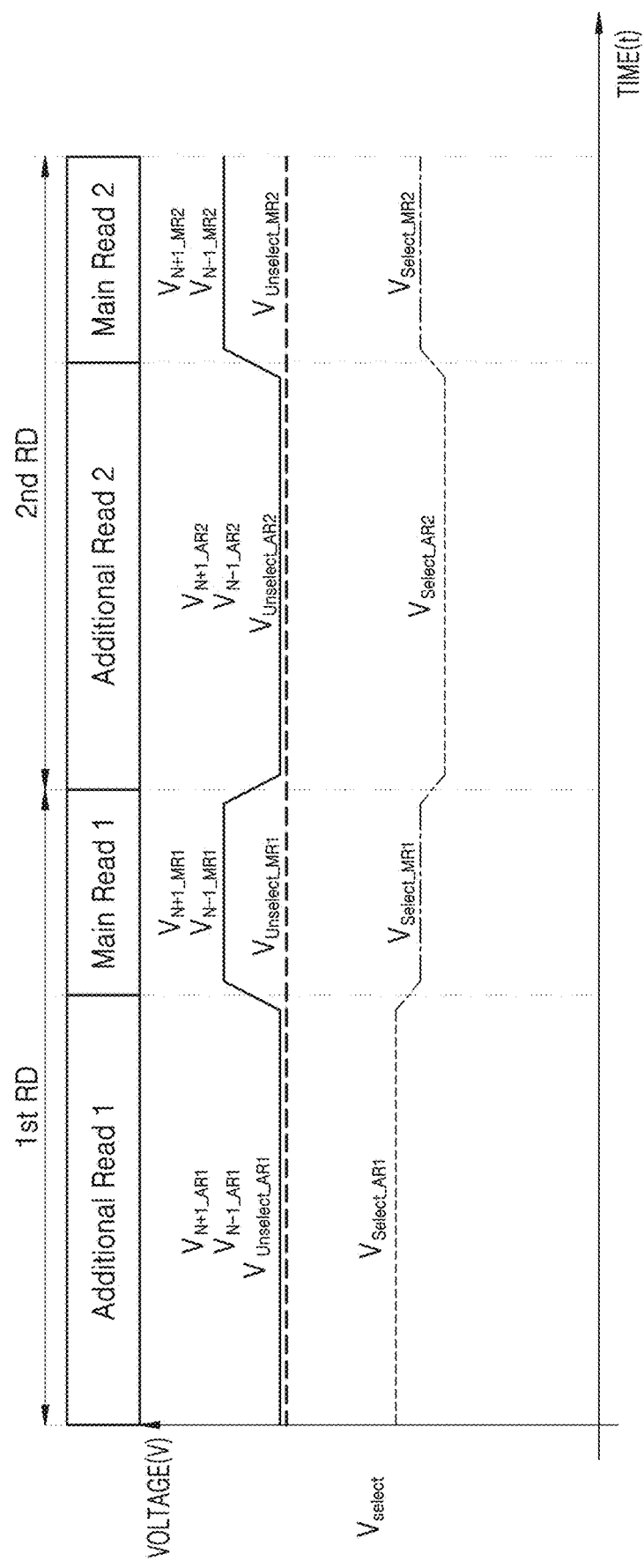
FIG. 11 is a diagram illustrating an additional read operation according to an example embodiment.

FIG. 11 is a diagram illustrating additional read operations according to an example embodiment.

A series of operations including the additional read operation and the main read operation described with reference to FIGS. 1 to 10 may be performed a plurality of times. Here, the additional read operation may include an OVS operation, a read operation for obtaining distribution information by checking a distribution deterioration level, or the like. However, the additional read operation is not limited thereto and may include a read operation for improving sensing characteristics of memory cells.

Referring to FIG. 11, a series of operations including the additional read operation and the main read operation may be performed twice. Here, the number of times the series of operations is performed is not limited to twice.

For example, when the additional read operation is a valley search operation, and memory cells to be read are TLCs, the series of operations may be performed two or three times according to pages to be read. In addition, when memory cells to be read are QLCs, reading of memory cells may be performed by dividing the memory cells into four pages and performing the series of operations on each of the pages three or four times.

That is, the series of operations, which includes the additional read operation including a valley search operation and the main read operation, may be performed a plurality of times as the control circuitry 13 (or the OVS circuit 16) controls the page buffer circuit 12 and the voltage generator 14.

According to an example embodiment, in the main read operation, a select voltage level $V_{Select\_MR1}$ applied to a selected word line $WL_N$ during a first main read, and a select voltage level $V_{Select\_MR2}$ applied to the selected word line $WL_N$ during a second main read may be determined by Equation 2 below. Here, the select voltage level $V_{Select\_MR1}$ during the first main read may be a read voltage level corresponding to an optimal valley in a first logic state of memory cells, and the select voltage level $V_{Select\_MR2}$ during the second main read may be a read voltage level corresponding to an optimal valley in a second logic state of the memory cells. That is, a read voltage level corresponding to an optimal valley may vary according to the logic state of memory cells.

$$V_{Select\_MR1} = V_{Select\_AR1} + V_{OVS\_OFFSET1} + V_{comp\_OFFSET1} \quad [\text{Equation 2}]$$

$$V_{Select\_MR2} = V_{Select\_AR2} + V_{OVS\_OFFSET2} + V_{comp\_OFFSET2}$$

Here, $V_{Select\_AR1}$ refers to a voltage applied to the selected word line selected during a first valley search. $V_{OVS\_OFFSET1}$ refers to an OVS offset voltage according to a valley found in the first valley search, $V_{comp\_OFFSET1}$ refers to a first compensation offset voltage, $V_{Select\_AR2}$ refers to a voltage applied to the selected word line during a second valley search, $V_{OVS\_OFFSET1}$ refers to an OVS offset voltage according to a valley found in the second valley search, and $V_{comp\_OFFSET1}$ refers to a second compensation offset voltage.

Figure 12:
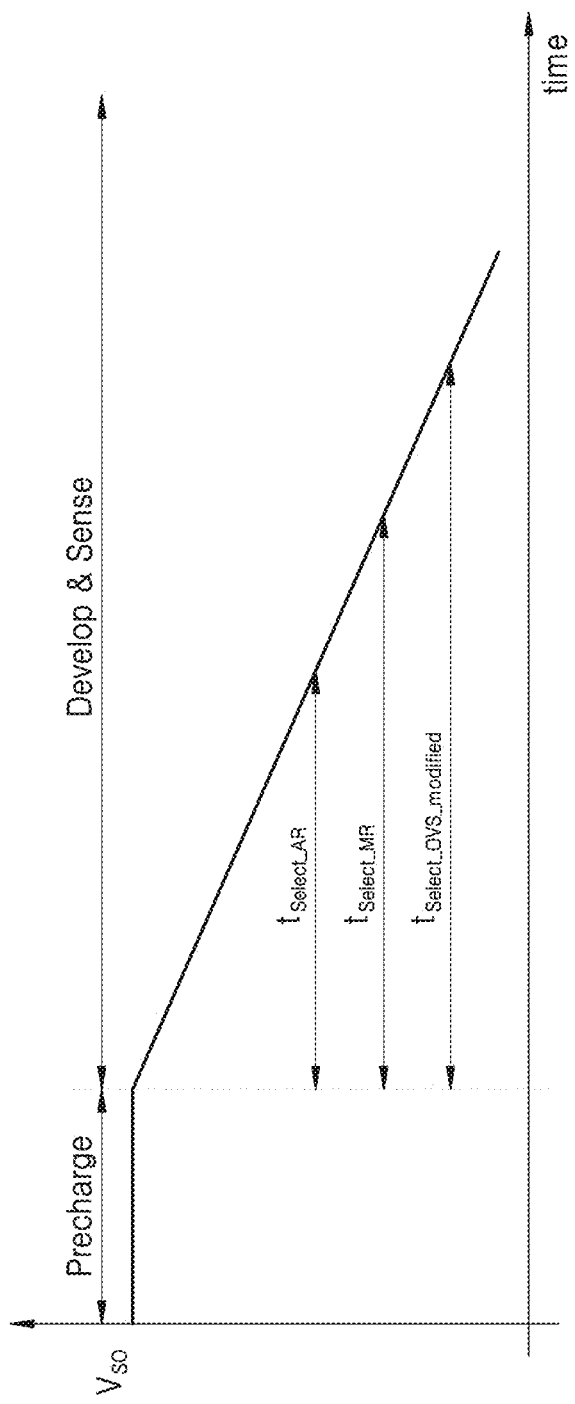
FIG. 12 is a diagram illustrating an operation of a memory device according to an example embodiment.

FIG. 12 is a diagram illustrating an operation of the memory device 10 according to an example embodiment.

In an example embodiment, an additional read operation and a main read operation may be performed in such a manner that the page buffer circuit 12 including the page buffers PB may latch a sensing node while controlling a develop time and stores results of sensing. Here, the additional read operation may include an OVS operation, a read operation for obtaining distribution information by checking a distribution deterioration level, or the like. However, the additional read operation is not limited thereto and may include a read operation for improving sensing characteristics of memory cells.

In this regard, the memory device 10 may perform the main read operation by controlling the develop time such that the buffer circuit 12 may sense a voltage corresponding to a second select voltage level $V_{Select\_MR}$ described with reference to FIG. 6. In an example embodiment, the control circuitry 13 or the OVS circuit 16 may vary the develop time of page buffers PB.

Referring to FIG. 12, each of the page buffers PB may pre-charge a sensing node up to a specific voltage level $V_{SO}$, develop bit lines, and store results of sensing through the sensing node.

In FIG. 12, $t_{Select\_AR}$ refers to a develop time allowing the page buffer circuit 12 to detect a voltage level $V_{Select\_AR}$ applied to the selected word line in an additional read operation, $t_{Select\_OVS\_modified}$ refers to a develop time allowing the page buffer circuit 12 to detect a voltage level in which an OVS offset voltage $V_{OVS\_OFFSET}$ determined according to a valley found in a valley search operation is reflected to the voltage level $V_{Select\_AR}$ applied to the selected word line in the additional read operation including the valley search operation, and $t_{Select\_MR}$ refers to a develop time allowing the page buffer circuit 12 to detect a voltage level $V_{Select\_MR}$ corresponding to an optimal valley according to the present inventive concepts. The develop times $t_{Select\_AR}$, $t_{Select\_OVS\_modified}$, and $t_{Select\_MR}$ shown in FIG. 12 are merely examples, and may vary relative to each other according to distributions.

Figure 13:
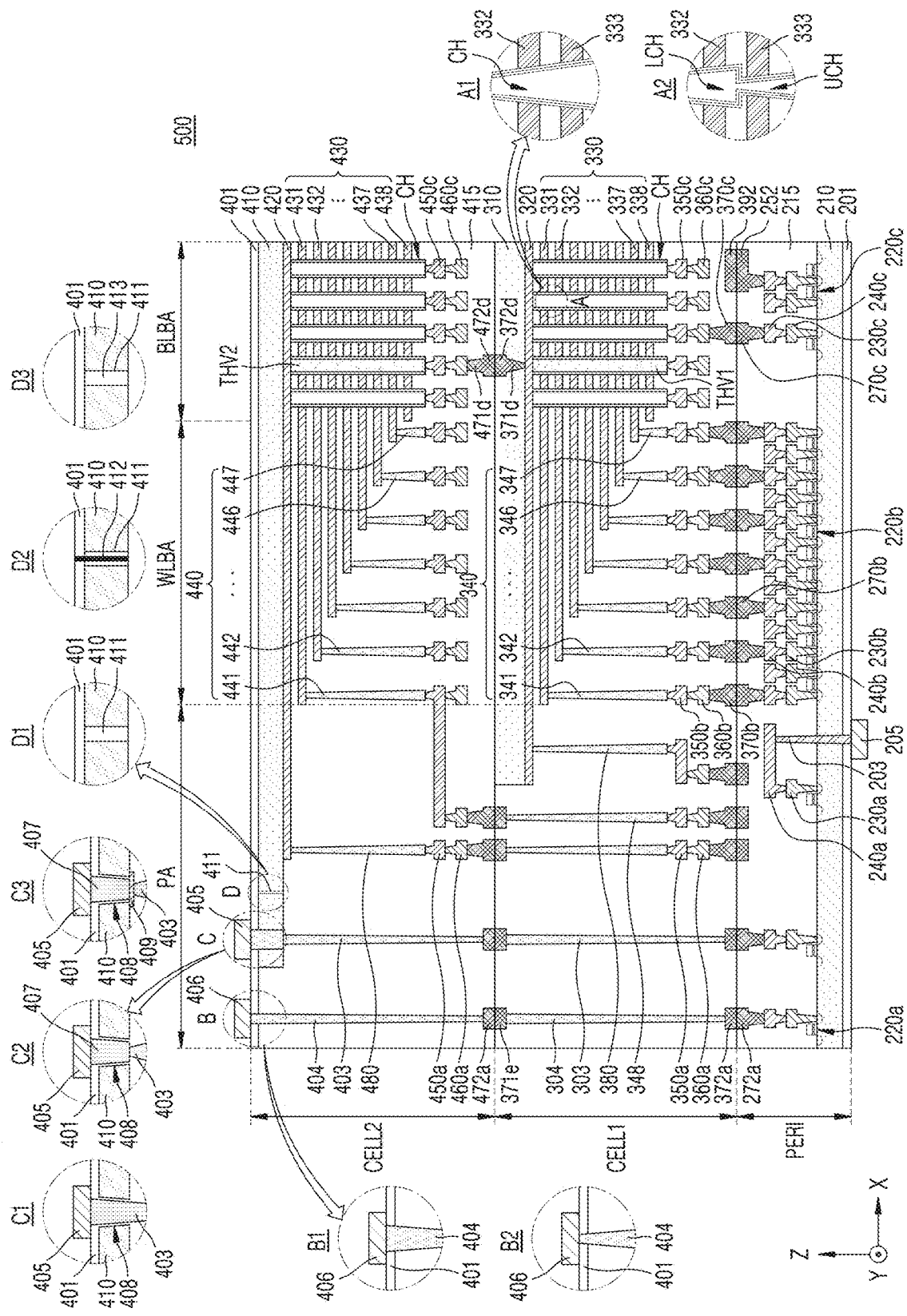
FIG. 13 is a cross-sectional view illustrating a memory device having a B-VNAND structure, according to an embodiment.

FIG. 13 is a cross-sectional view illustrating a memory device 500 having a B-VNAND structure according to an example embodiment.

Referring to FIG. 13, the memory device 500 may have a chip-to-chip (C2C) structure. Here, the C2C structure may refer to a structure provided by individually fabricating at least one upper chip including a cell region CELL and a lower chip including a peripheral circuit region PERI, and combining the at least one upper chip and the lower chip with each other by a bonding method. For example, the bonding method may refer to a method of electrically or physically connecting a bonding metal pattern formed on an uppermost metal layer of an upper chip and a bonding metal pattern formed on an uppermost metal layer of a lower chip to each other. For example, when the bonding metal patterns include copper (Cu), the bonding method may be a Cu—Cu bonding method. In another example, the bonding metal patterns may include aluminum (Al) or tungsten (W), but is not limited thereto.

The memory device 500 may include at least one upper chip including a cell region. For example, as shown in FIG. 13, the memory device 500 may include two upper chips. However, this is merely an example, and the number of upper chips is not limited thereto. When the memory device 500 include two upper chips, the memory device 500 may be provided by individually fabricating a first upper chip including a first cell region CELL1, a second upper chip including a second cell region CELL2, and a lower chip including a peripheral circuit region PERI, and then connecting the first upper chip, the second upper chip, and the lower chip to each other by a bonding method. The first upper chip may be flipped and connected to the lower chip by a bonding method, and the second upper chip may also be flipped and connected to the first upper chip by a bonding method. In the following description, upper and lower portions of the first and second upper chips are defined based on the positions of the first and second upper chips before the first and second upper chips are flipped. That is, in FIG. 13, an upper portion of the lower chip refers to an upper portion defined based on a positive (+) Z-axis direction, and the upper portion of each of the first and second upper chips refers to an upper portion defined based on a negative (−) Z-axis direction. However, this is merely an example, and only one of the first and second upper chips may be flipped and connected by a bonding method.

The peripheral circuit region PERI and the first and second cell regions CELL1 and CELL2 of the memory device 500 may include an external pad bonding region PA, a word line bonding region WLBA, and a bit line bonding region BLBA.

The peripheral circuit region PERI may include a first substrate 210 and a plurality of circuit elements 220*a*, 220*b*, and 220*c* formed on the first substrate 210. An interlayer insulating layer 215 including one or more insulating layers may be provided on the circuit elements 220*a*, 220*b*, and 220*c*, and a plurality of metal wires connecting the circuit elements 220*a*, 220*b*, and 220*c* to each other may be provided in the interlayer insulating layer 215. For example, the metal wires may include: first metal wires 230*a*, 230*b*, and 230*c* respectively connected to the circuit elements 220*a*, 220*b*, and 220*c*; and second metal wirings 240*a*, 240*b*, and 240*c* formed on the first metal wires 230*a*, 230*b*, and 230*c*. The metal wires may include at least one of various conductive materials. For example, the first metal wires 230*a*, 230*b*, and 230*c* may include tungsten having a relatively high electrical resistivity, and the second metal wires 240*a*, 240*b*, and 240*c* may include copper having a relatively low electrical resistivity.

Although only the first metal wires 230*a*, 230*b*, and 230*c* and the second metal wires 240*a*, 240*b*, and 240*c* are shown and described in the present specification, example embodiments are not limited thereto. For example, one or more additional metal wires may be further formed on the second metal wires 240*a*, 240*b*, and 240*c*. In this case, the second metal wires 240*a*, 240*b*, and 240*c* may include aluminum. In addition, at least some of the additional metal wires formed on the second metal wires 240*a*, 240*b*, and 240*c* may include copper having an electrical resistivity lower than the electrical resistivity of aluminum included in the second metal wires 240*a*, 240*b*, and 240*c*.

The interlayer insulating layer 215 is disposed on the first substrate 210 and may include an insulating material such as silicon oxide or silicon nitride, but is not limited thereto.

Each of the first and second cell regions CELL1 and CELL2 may include at least one memory block. The first cell region CELL1 may include a second substrate 310 and a common source line 320. A plurality of word lines 331 to 338 (330) may be stacked on the second substrate 310 in a direction (positive Z-axis direction) perpendicular to an upper surface of the second substrate 310. String select lines and a ground select line may be disposed above and below the word lines 330. That is, the word lines 330 may be disposed between the string select lines and the ground select line. Similarly, the second cell region CELL2 may include a third substrate 410 and a common source line 420, and a plurality of word lines 431 to 438 (430) may be stacked in a direction (positive Z-axis direction) perpendicular to an upper surface of the third substrate 410. The second substrate 310 and the third substrate 410 may include various materials. For example, each of the second substrate 310 and the third substrate 410 may be a silicon substrate, a silicon-germanium substrate, a germanium substrate, or a monocrystal silicon substrate on which a monocrystal epitaxy is grown. A plurality of channel structures CH may be formed in each of the first and second cell regions CELL1 and CELL2.

In an example embodiment, as shown in a portion A1 of FIG. 13, the channel structures CH are provided in the bit line bonding region BLBA and extend in a direction perpendicular to the upper surface of the second substrate 310 to pass through the word lines 330 the string select lines, and the ground select lines. Each of the channel structures CH may include a data storage layer, a channel layer, and a buried insulating layer. The channel layer may be electrically connected to a first metal wire 350*c* and a second metal wire 360*c* in the bit line bonding region BLBA. For example, the second metal wire 360*c* may be a bit line and may be connected to the channel structure CH through the first metal wire 350*c*. The second metal wire 360*c* (hereinafter also referred to as a bit line 360*c*) may extend in a first direction (Y-axis direction) parallel to the upper surface of the second substrate 310.

In an example embodiment, as shown in a portion A2 of FIG. 13, each of the channel structures CH may include a lower channel LCH and an upper channel UCH that are connected to each other. For example, the channel structure CH may be formed through a process of forming the lower channel LCH and a process of forming the upper channel UCH. The lower channel LCH may extend in a direction perpendicular to the upper surface of the second substrate 310 and pass through the common source line 320 and the (lower) word lines 331 and 332. The lower channel LCH may include the data storage layer, the channel layer, and the buried insulating layer, and may be connected to the upper channel UCH. The upper channel UCH may pass through the (upper) word lines 333 to 338. The upper channel UCH may include the data storage layer, the channel layer, and the buried insulating layer, and the channel layer of the upper channel UCH may be electrically connected to the first metal wire 350*c* and the second metal wire 360*c*. As the length of channels increases, it may be difficult to form the channels to have a constant width due to process conditions. The memory device 500 of the example embodiment may include channels having improved width uniformity owing to the lower and upper channels LCH and UCH formed through sequential processes.

As shown in the portion A2 of FIG. 13, when each of the channel structures CH include the lower channel LCH and the upper channel UCH, a word line positioned near boundaries of the lower channel LCH and the upper channel UCH may be a dummy word line. For example, the word line 332 and the word line 333 that form the boundaries of the lower channel LCH and the upper channel UCH may be dummy word lines. In this case, data may not be stored in memory cells connected to the dummy word lines. Alternatively, the number of pages corresponding to memory cells connected to the dummy word lines may be less than the number of pages corresponding to memory cells connected to general word lines. A voltage level applied to the dummy word lines may be different from a voltage level applied to the general word lines, and thus, the effect of a non-uniform channel width between the lower channel LCH and the upper channel UCH on the operation of the memory device 500 may be reduced.

In addition, referring to a portion A2 of FIG. 13, the number of lower word lines 331 and 332 through which the lower channel LCH passes is less than the number of upper word lines 333 to 338 through which the upper channel UCH passes. However, this is merely an example, and the present inventive concepts are not limited thereto. In another example, the number of lower word lines through which the lower channel LCH passes may be greater than or equal to the number of upper word lines through which the upper channel UCH passes. In addition, the configuration and connection type of the channel structures CH disposed in the first cell region CELL1 may be equally applied to the channel structures CH disposed in the second cell region CELL2.

In the bit line bonding region BLBA, a first penetration electrode THV1 may be provided in the first cell region CELL1, and a second penetration electrode THV2 may be provided in the second cell region CELL2. As shown in FIG. 13, the first penetration electrode THV1 may pass through the common source line 320 and the word lines 330. However, this is merely an example, and the first penetration electrode THV1 may further penetrate the second substrate 310. The first penetration electrode THV1 may include a conductive material. Alternatively, the first penetration electrode THV1 may include a conductive material surrounded by an insulating material. The second penetration electrode THV2 may be provided in the same shape and structure as the first penetration electrode THV1.

In an example embodiment, the first penetration electrode THV1 and the second penetration electrode THV2 may be electrically connected to each other via a first penetration metal pattern 372d and a second penetration metal pattern 472d. The first penetration metal pattern 372d may be formed on a lower end of the first upper chip including the first cell region CELL1, and the second penetration metal pattern 472d may be formed on an upper end of the second upper chip including the second cell region CELL2. The first penetration electrode THV1 may be electrically connected to the first metal wire 350c and the second metal wire 360c. A lower via 371d may be formed between the first penetration electrode THV1 and the first penetration metal pattern 372d, and an upper via 471d may be formed between the second penetration electrode THV2 and the second penetration metal pattern 472d. The first penetration metal pattern 372d and the second penetration metal pattern 472d may be connected to each other by a bonding method.

Furthermore, in the bit line bonding region BLBA, an upper metal pattern 252 may be formed on an uppermost metal layer of the peripheral circuit region PERI, and an upper metal pattern 392 having the same shape as the upper metal pattern 252 may be formed on an uppermost metal layer of the first cell region CELL1. The upper metal pattern 392 of the first cell region CELL1 and the upper metal pattern 252 of the peripheral circuit region PERI may be electrically connected to each other by a bonding method. In the bit line bonding region BLBA, the bit line 360c may be electrically connected to a page buffer included in the peripheral circuit region PERI. For example, some of the circuit elements 220c of the peripheral circuit region PERI may provide a page buffer, and the bit line 360c may be electrically connected to the circuit elements 220c providing the page buffer through an upper bonding metal 370c of the first cell region CELL1 and an upper bonding metal 270c of the peripheral circuit region PERI.

Referring to FIG. 13, in the word line bonding region WLBA, the word lines 330 of the first cell region CELL1 may extend in a second direction (X-axis) parallel to the upper surface of the second substrate 310 and may be connected to a plurality of cell contact plugs 341 to 347 (340). First metal wires 350b and second metal wires 360b may be sequentially connected to upper portions of the cell contact plugs 340 connected to the word lines 330. In the word line boding region WLBA, the cell contact plugs 340 may be connected to the peripheral circuit region PERI through an upper bonding metal 370b of the first cell region CELL1 and an upper bonding metal 270b of the peripheral circuit region PERI.

The cell contact plugs 340 may be electrically connected to a row decoder included in the peripheral circuit region PERI. For example, some of the circuit elements 220b of the peripheral circuit region PERI may provide the row decoder, and the cell contact plugs 340 may electrically connected to the circuit elements 220b providing the row decoder through the upper bonding metal 370b of the first cell region CELL1 and the upper bonding metal 270b of the peripheral circuit region PERI. In an example embodiment, the operating voltage of the circuit elements 220b providing the row decoder may be different from the operating voltage of the circuit elements 220c providing the page buffer. For example, the operating voltage of circuit elements 220c providing the page buffer may be greater than the operating voltage of the circuit elements 220b providing the row decoder.

Similarly, in the word line bonding region WLBA, the word lines 430 of the second cell region CELL2 may extend in the second direction (X-axis direction) parallel to the upper surface of the third substrate 410, and may be connected to a plurality of cell contact plugs 441 to 447 (440). The cell contact plugs 440 may be connected to the peripheral circuit region PERI through an upper metal pattern of the second cell region CELL2, lower and upper metal patterns of the first cell region CELL1, and cell contact plugs 348.

In the word line bonding region WLBA, the upper bonding metal 370b may be formed in the first cell region CELL1, and the upper bonding metal 270b may be formed in the peripheral circuit region PERI. The upper bonding metal 370b of the one cell region CELL1 and the upper bonding metal 270b of the peripheral circuit region PERI may be electrically connected to each other by a bonding method. The upper bonding metal 370b and the upper bonding metal 270b may include aluminum, copper, or tungsten.

In the external pad bonding region PA, a lower metal pattern 371e may be formed in a lower portion of the first cell region CELL1, and an upper metal pattern 472a may be formed in an upper portion of the second cell region CELL2. The lower metal pattern 371e of the first cell region CELL1 and the upper metal pattern 472a of the second cell region CELL2 may be connected to each other by a bonding method in the external pad bonding region PA. Similarly, an upper metal pattern 372a may be formed in an upper portion of the first cell region CELL1, and an upper metal pattern 272a may be formed in an upper portion of the peripheral circuit region PERI. The upper metal pattern 372a of the first cell region CELL1 and the upper metal pattern 272a of the peripheral circuit region PERI may be connected to each other by a bonding method.

Common source line contact plugs 380 and 480 may be disposed in the external pad bonding region PA. The common source line contact plugs 380 and 480 may include a conductive material such as a metal, a metal compound, or doped polysilicon, but is not limited thereto. The common source line contact plug 380 of the first cell region CELL1 may be electrically connected to the common source line 320, and the common source line contact plug 480 of the second cell region CELL2 may be electrically connected to the common source line 420. A first metal wire 350a and a second metal wire 360a may be sequentially stacked on the common source line contact plug 380 of the first cell region CELL1, and a first metal wire 450a and a second metal wire 460a may be sequentially stacked on the common source line contact plug 480 of the second cell region CELL2.

First, second, and third Input/output pads 205, 405, and 406 may be disposed in the external pad bonding region PA. Referring to FIG. 13, a lower insulating layer 201 may cover a lower surface of the first substrate 210, and the first input/output pad 205 may be formed on the lower insulating layer 201. The first input/output pad 205 may be connected to at least one of the circuit elements 220a arranged in the peripheral circuit region PERI through a first input/output contact plug 203, and may be separated from the first substrate 210 by the lower insulating layer 201. In addition, a lateral insulating layer may be disposed between the first input/output contact plug 203 and the first substrate 210 to electrically separate the first input/output contact plug 203 from the first substrate 210.

An upper insulating layer 401 covering the upper surface of the third substrate 410 may be formed on the third substrate 410. The second input/output pad 405 and/or the third input/output pad 406 may be arranged on the upper insulating layer 401. The second input/output pad 405 may be connected to at least one of the circuit elements 220a disposed in the peripheral circuit region PERI through second input/output contact plugs 403 and 303, and the third input/output pad 406 may be connected to at least one of the circuit elements 220a disposed in the peripheral circuit region PERI through third input/output contact plugs 404 and 304.

In an example embodiment, the third substrate 410 may not be provided in a region in which input/output contact plugs are arranged. For example, as shown in a portion B of FIG. 13, the third input/output contact plug 404 may be apart from the third substrate 410 in a direction parallel to the upper surface of the third substrate 410, and may be connected to the third input/output pad 406 through an interlayer insulating layer 415 of the second cell region CELL2. In this case, the third input/output contact plug 404 may be formed through various processes.

For example, as shown in a portion B1 of FIG. 13, the third input/output contact plug 404 may extend in a third direction (Z-axis direction) and may have a diameter increasing in a direction toward the upper insulating layer 401. That is, while the diameters of the channel structures CH described with reference to a portion A1 of FIG. 13 decrease in a direction toward the upper insulating layer 401, the diameter of the third input/output contact plug 404 may increase in a direction toward the upper insulating layer 401. For example, the third input/output contact plug 404 may be formed after the second cell region CELL2 and the first cell region CELL1 are bonded together.

In addition, for example, as shown in a portion B2 of FIG. 13, the third input/output contact plug 404 may extend in the third direction (Z-axis direction) and have a diameter decreasing in a direction toward the upper insulating layer 401. That is, the diameter of the third input/output contact plug 404 may decrease in a direction toward the upper insulating layer 401 like the channel structures CH. For example, the third input/output contact plug 404 may be formed together with the cell contact plugs 440 before the second cell region CELL2 and the first cell region CELL1 are bonded together.

In some example embodiments, input/output contact plugs may overlap the third substrate 410. For example, as shown in a portion C of FIG. 13, the second input/output contact plug 403 may penetrate the interlayer insulating layer 415 of the second cell region CELL2 in the third direction (Z-axis direction) and may be electrically connected to the second input/output pad 405 through the substrate 410. In this case, the connection structure between the second input/output contact plug 403 and the second input/output pad 405 may be implemented in various manners.

For example, as shown in a portion C1 of FIG. 13, an opening 408 may be formed through the third substrate 410, and the second input/output contact plug 403 may be directly connected to the second input/output pad 405 through the opening 408 formed in the third substrate 410.

In this case, as shown in the portion C1 of FIG. 13, the diameter of the second input/output contact plug 403 increase in a direction toward the second input/output pad 405. However, this is merely an example. In another example, the diameter of the second input/output contact plug 403 may decrease in a direction toward the second input/output pad 405.

For example, as shown in a portion C2 of FIG. 13, an opening 408 may be formed through the third substrate 410, and a contact 407 may be formed in the opening 408. An end of the contact 407 may be connected to the second input/output pad 405, and the other end of the contact 407 may be connected to the second input/output contact plug 403. Therefore, the second input/output contact plug 403 may be electrically connected to the second input/output pad 405 through the contact 407 formed in the opening 408. In this case, as shown in the portion C2 of FIG. 13, the diameter of the contact 407 may increase in a direction toward the second input/output pad 405, and the diameter of the second input/output contact plug 403 may decrease in a direction toward the second input/output pad 405. For example, the third input/output contact plug 403 may be formed together with the cell contact plugs 440 before the second cell region CELL2 and the first cell region CELL1 are bonded together. The contact 407 may be formed after the second cell region CELL2 and the first cell region CELL1 are bonded together.

In addition, for example, as shown in a portion C3 of FIG. 13, a stopper 409 may be further formed on an upper surface of the opening 408 of the third substrate 410 compared to the structure shown in the portion C2. The stopper 409 may be a metal wire formed in the same layer as the common source line 420. However, this is merely an example, and the stopper 409 may be a metal wire formed in the same layer as at least one of the word lines 430. The second input/output contact plug 403 may be electrically connected to the second input/output pad 405 through the contact 407 and the stopper 409.

In addition, like the second and third input/output contact plugs 403 and 404 of the second cell region CELL2, the second and third input/output contact plugs 303 and 304 of the first cell region CELL1 may each have a diameter decreasing in a direction toward the lower metal pattern 371e or increasing in a direction toward the lower metal pattern 371c.

In addition, according to some example embodiments, a slit 411 may be formed in the third substrate 410. For example, the slit 411 may be formed at an arbitrary position of the external pad bonding region PA. For example, as shown in a portion D of FIG. 13, the slit 411 may be located between the second input/output pad 405 and the cell contact plugs 440 when viewed in a plan view. However, this is merely an example, and the slit 411 may be formed such that the second input/output pad 405 may be positioned between the slit 411 and the cell contact plugs 440 when viewed in a plan view.

For example, as shown in a portion D1 of FIG. 13, the slit 411 may pass through the third substrate 410. For example, the slit 411 may limit and/or prevent the third substrate 410 from finely cracking when the opening 408 is formed. However, this is merely an example, and the slit 411 may be formed to a depth of about 60% to about 70% of the thickness of the third substrate 410.

In addition, for example, as shown in a portion D2 of FIG. 13, a conductive material 412 may be formed in the slit 411. For example, the conductive material 412 may have a function of discharging leakage current generated when circuit elements of the external pad bonding region PA are driven. In this case, the conductive material 412 may be connected to an external ground line.

In addition, for example, as shown in a portion D3 of FIG. 13, an insulating material 413 may be formed in the slit 411. For example, the insulating material 413 may electrically separate the second input/output pad 405 and the second input/output contact plug 403 disposed in the external pad bonding region PA from the word line bonding region WLBA. Owing to the insulating material 413 formed in in the slit 411, voltage provided through the second input/output pad 405 may not affect metal layers arranged on the third substrate 410 in the word line bonding region WLBA.

In addition, according to some example embodiments, the first to third input/output pads 205, 405, and 406 may be selectively formed. For example, the memory device 500 may include only the first input/output pad 205 disposed on the first substrate 201, only the second input/output pad 405 disposed on the third substrate 410, or only the third input/output pad 406 disposed on the upper insulating layer 401.

Furthermore, according to some example embodiments, at least one of the second substrate 310 of the first cell region CELL1 and the third substrate 410 of the second cell region CELL2 may be used as a sacrificial substrate and may be completely or partially removed before or after a bonding process. An additional layer may be formed after the sacrificial substrate is removal. For example, the second substrate 310 of the first cell region CELL1 may be removed before or after the peripheral circuit region PERI and the first cell region CELL1 are bonded together, and an insulating layer or a conductive layer may be formed to cover or connect an upper surface of the common source line 320. Similarly, the third substrate 410 of the second cell region CELL2 may be removed before or after the first cell region CELL1 and the second cell region CELL2 are bonded together, and the upper insulating layer 401 or a conductive layer may be formed to cover or connect an upper surface of the common source line 420.

Figure 14:
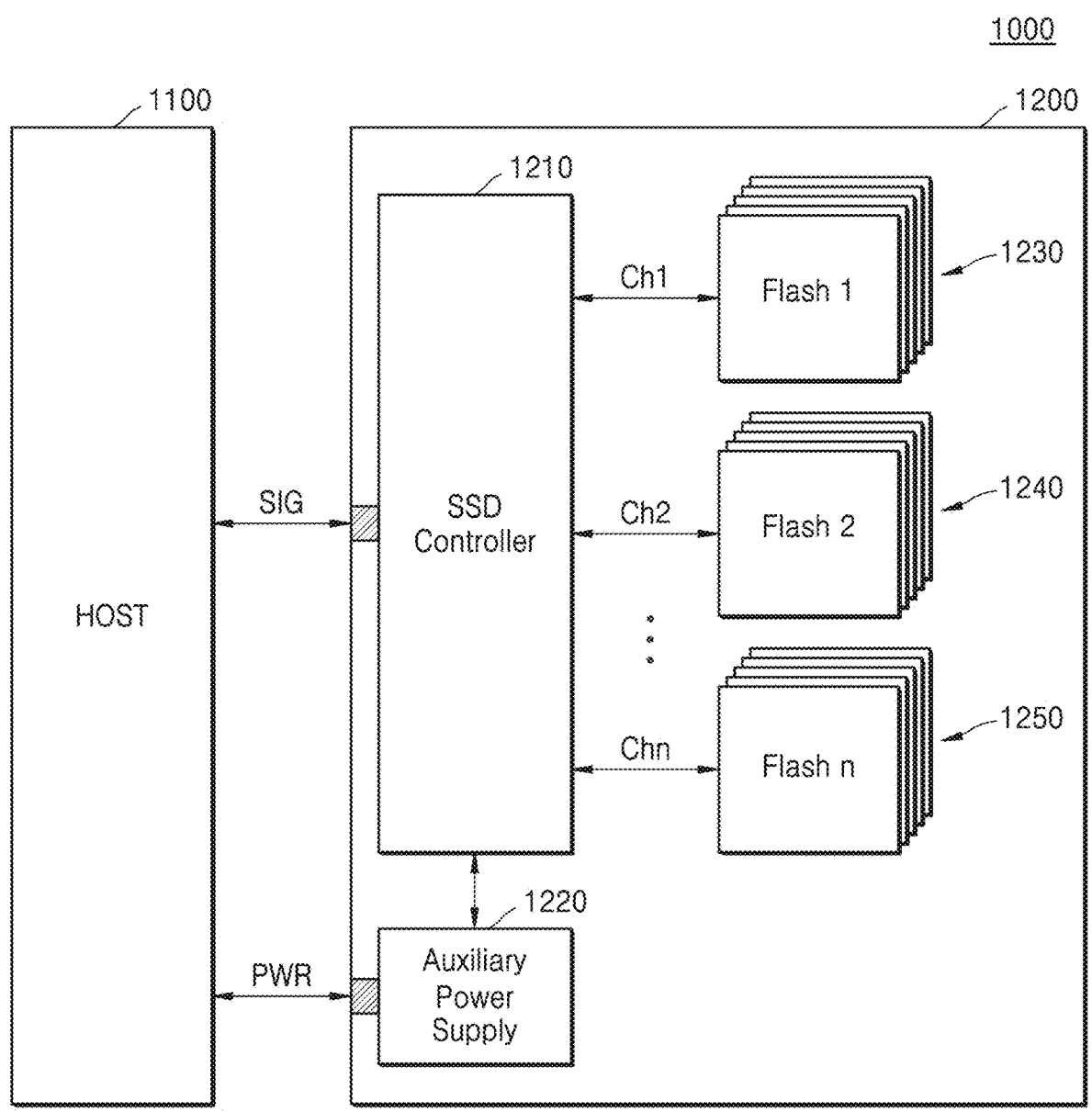
FIG. 14 is a block diagram illustrating an example in which memory devices are applied to a solid state drive (SSD) system according to some example embodiments.

FIG. 14 is a block diagram illustrating an example in which memory devices are applied to a solid state drive (SSD) system 1000 according to some example embodiments.

Referring to FIG. 14, the SSD system 1000 may include a host 1100 and an SSD 1200. The SSD 1200 may exchange signals with the host 1100 through a signal connector and may receive power through a power connector. The SSD 1200 may include an SSD controller 1210, an auxiliary power supply 1220, and memory devices 1230, 1240, and 1250. The memory devices 1230, 1240, and 1250 may be a vertically stacked NAND flash memory devices. In this case, the SSD 1200 may be implemented according to the example embodiments described above with reference to FIGS. 1 to 13. Therefore, each of the memory devices 1230, 1240, and 1250 may perform an additional read operation and a main read operation.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the present inventive concepts have been particularly shown and described with reference to embodiments thereof, it will be understood that various changes in form and details may be made therein without departing from the spirit and scope of the following claims.

What is claimed is:

1. A method of operating a memory device comprising a memory cell array, the memory cell array comprising a plurality of memory cells and a plurality of word lines connected to the plurality of memory cells, the method comprising:
performing an additional read operation on the plurality of memory cells by,
adjusting a voltage level applied to a selected word line $WL_N$ connected to memory cells to be additionally read, and
adjusting a voltage level applied to at least one unselected word line amongst a plurality of unselected word lines $WL_{Unselect}$ by adjusting at least one of i) a voltage level $V_{N+1_{AR}}$ applied to an upper word line $WL_{N+1}$ adjacent to an upper side of the selected word line $WL_N$ among the plurality of unselected word lines $WL_{Unselect}$ to be lower than a voltage level $V_{N+1_{MR}}$ applied to the upper word line $WL_{N+1}$ in a main read operation or ii) a voltage level $V_{N-1_{AR}}$ applied to a lower word line $WL_{N-1}$ adjacent to a lower side of the selected word line $WL_N$ among the plurality of unselected word lines $WL_{Unselect}$ to be lower than a voltage level $V_{N-1_{MR}}$ applied to the lower word line $WL_{N-1}$ in a main read operation; and
performing the main read operation on the plurality of memory cells by adjusting a voltage level applied to at least one first word line among the plurality of unselected word lines $WL_{Unselect}$ to be different from a voltage level applied to the at least one first word line in the additional read operation.

2. The method of claim 1, wherein the performing of the main read operation comprises adjusting the voltage level $V_{N+1_{MR}}$ applied to the upper word line $WL_{N+1}$ adjacent to the upper side of the selected word line $WL_N$ among the plurality of unselected word lines $WL_{Unselect}$ and the voltage level $V_{N-1_{MR}}$ applied to the lower word line $WL_{N-1}$ adjacent to the lower side of the selected word line $WL_N$ among the plurality of unselected word lines $WL_{Unselect}$ to be each different from a voltage level $V_{Unselect_{MR}}$ applied to other unselected word lines $WL_{Unselect}$-$WL_{N+1}$-$WL_{N-1}$ except for the upper word line $WL_{N+1}$ and the lower word line $WL_{N-1}$.

3. The method of claim 2, wherein the performing of the main read operation comprises adjusting the voltage level $V_{N+1_{MR}}$ applied to the upper word line $WL_{N+1}$ and the voltage level $V_{N-1_{MR}}$ applied to the lower word line $WL_{N-1}$ to be each greater than the voltage level $V_{Unselect_{MR}}$ applied to the other unselected word lines $WL_{Unselect}$-$WL_{N+1}$-$WL_{N-1}$.

4. The method of claim 1, wherein the performing of the additional read operation comprises adjusting both the voltage level $V_{N+1_{AR}}$ applied to the upper word line $WL_{N+1}$ and the voltage level $V_{N-1_{AR}}$ applied to the lower word line $WL_{N-1}$ to be respectively lower than the voltage level $V_{N+1_{MR}}$ applied to the upper word line $WL_{N+1}$ and the voltage level $V_{N-1_{MR}}$ applied to the lower word line $WL_{N-1}$ in the main read operation.

5. The method of claim 1, wherein the performing of the main read operation comprises applying a second select voltage level $V_{select_{MR}}$ to the selected word line $WL_N$, the second select voltage level $V_{select_{MR}}$ being different from a first select voltage level $V_{Select_{AR}}$ applied to the selected word line $WL_N$ in the additional read operation, wherein the second select voltage level $V_{Select_{MR}}$ is determined based on an on-chip valley search (OVS) offset voltage $V_{OVS_{OFFSET}}$ and a compensation offset voltage $V_{comp_{OFFSET}}$ that are determined by the additional read operation.

6. The method of claim 5, wherein the compensation offset voltage $V_{comp_{OFFSET}}$ is determined based on at least one of word line positions, pages to be read, and threshold voltage distribution states to be read.

7. The method of claim 5, wherein the performing of the main read operation comprises adjusting a develop time such that a page buffer detects a voltage corresponding to the second select voltage level $V_{Select_{MR}}$.

8. The method of claim 1, wherein the performing of the main read operation comprises adjusting a voltage level applied to the upper word line $WL_{N+1}$ adjacent to the upper side of the selected word line $WL_N$ among the plurality of unselected word lines and a voltage level applied to the lower word line $WL_{N-1}$ adjacent to the lower side of the selected word line $WL_N$ among the plurality of unselected word lines $WL_{Unselect}$ to be different from each other.

9. A memory device comprising:
a memory cell array comprising a plurality of memory cells and a plurality of word lines connected to the plurality of memory cells; and
control circuitry configured to,
control the memory device to perform an additional read operation on the plurality of memory cells by,
adjusting a voltage level applied to a selected word line $WL_N$ connected to memory cells to be additionally read, and
adjusting a voltage level applied to at least one unselected word line amongst a plurality of unselected word lines $WL_{Unselect}$ by adjusting at least one of i) a voltage level $V_{N+1_{AR}}$ applied to an upper word line $WL_{N+1}$ adjacent to an upper side of the selected word line $WL_N$ among the plurality of unselected word lines $WL_{Unselect}$ to be lower than a voltage level $V_{N+1_{MR}}$ applied to the upper word line $WL_{N+1}$ in a main read operation or ii) a voltage level $V_{N-1_{AR}}$ applied to a lower word line $WL_{N-1}$ adjacent to a lower side of the selected word line $WL_N$ among the plurality of unselected word lines $WL_{Unselect}$ to be lower than a voltage level $V_{N-1_{MR}}$ applied to the lower word line $WL_{N-1}$ in a main read operation, and
control the memory device to perform the main read operation on the plurality of memory cells by adjusting a voltage level applied to at least one first word line among the plurality of unselected word lines $WL_{Unselect}$ to be different from a voltage level applied to the at least one first word line in the additional read operation.

10. The memory device of claim 9, wherein the control circuitry is configured to control the memory device to perform the main read operation by adjusting the voltage level $V_{N+1_{MR}}$ applied to the upper word line $WL_{N+1}$ adjacent to the upper side of the selected word line $WL_N$ among the plurality of unselected word lines $WL_{Unselect}$ and the voltage level $V_{N-1_{MR}}$ applied to the lower word line $WL_{N-1}$ adjacent to the lower side of the selected word line $WL_N$ among the plurality of unselected word lines $WL_{Unselect}$ to be each different from a voltage level $V_{Unselect_{MR}}$ applied to other unselected word lines $WL_{Unselect}$-$WL_{N+1}$-$WL_{N-1}$ except for the upper word line $WL_{N+1}$ and the lower word line $WL_{N-1}$.

11. The memory device of claim 10, wherein the control circuitry is configured to control the memory device to perform the main read operation by adjusting the voltage level $V_{N+1_{MR}}$ applied to the upper word line $WL_{N+1}$ and the voltage level $V_{N-1_{MR}}$ applied to the lower word line $WL_{N-1}$ to be each greater than the voltage level $V_{Unselect_{MR}}$ applied to the other unselected word lines $WL_{Unselect}$-$WL_{N+1}$-$WL_{N-1}$.

12. The memory device of claim 9, wherein the control circuitry is configured to control the memory device to perform the additional read operation by adjusting both the voltage level $V_{N+1_{AR}}$ applied to the upper word line $WL_{N+1}$ and the voltage level $V_{N-1_{AR}}$ applied to the lower word line $WL_{N-1}$ to be respectively lower than the voltage level $V_{N+1_{MR}}$ applied to the upper word line $WL_{N+1}$ and the voltage level $V_{N-1_{MR}}$ applied to the lower word line $WL_{N-1}$ in the main read operation.

13. The memory device of claim 9, wherein the control circuitry is configured to control the memory device to perform the main read operation by applying, to the selected word line $WL_N$, a second select voltage level $V_{Select_{MR}}$ that is different from a first select voltage level $V_{Select_{AR}}$ applied to the selected word line $WL_N$ in the additional read operation,
wherein the second select voltage level $V_{Select_{MR}}$ is determined based on an on-chip valley search (OVS) offset voltage $V_{OVS_{OFFSET}}$ and a compensation offset voltage $V_{comp_{OFFSET}}$ that are determined by the additional read operation.

14. The memory device of claim 13, wherein the compensation offset voltage $V_{comp_{OFFSET}}$ is determined based on at least one of word line positions, pages to be read, and threshold voltage distribution states to be read.

15. The memory device of claim 13, wherein the control circuitry is configured to control the memory device to adjust a develop time to allow a page buffer to detect a voltage corresponding to the second select voltage level $V_{Select_{MR}}$.

16. A memory system comprising:
a memory device comprising a memory cell array and control circuitry, the memory cell array comprising a plurality of memory cells and a plurality of word lines connected to the plurality of memory cells, and the control circuitry is configured to control operations of a page buffer circuit and operations of a voltage generator; and
a memory controller configured to transmit a command to the memory device to control an operation of the memory device,
wherein the memory device is configured to perform an additional read operation on the plurality of memory cells in response to the command by,
adjusting a voltage level applied to a selected word line $WL_N$ connected to memory cells to be additionally read, and
adjusting a voltage level applied to at least one unselected word line amongst a plurality of unselected word lines $WL_{Unselect}$ by adjusting at least one of i) a voltage level $V_{N+1_{AR}}$ applied to an upper word line $WL_{N+1}$ adjacent to an upper side of the selected word line $WL_N$ among the plurality of unselected word lines $WL_{Unselect}$ to be lower than a voltage level $V_{N+1_{MR}}$ applied to the upper word line $WL_{N+1}$ in a main read operation or ii) a voltage level $V_{N-1_{AR}}$ applied to a lower word line $WL_{N-1}$ adjacent to a lower side of the selected word line $WL_N$ among the plurality of unselected word lines $WL_{Unselect}$ to be lower than a voltage level $V_{N-1_{MR}}$ applied to the lower word line $WL_{N-1}$ in a main read operation, and
the memory device is configured to perform the main read operation on the plurality of memory cells in response to the command by adjusting a voltage level applied to at least one first word line among the plurality of unselected word lines $WL_{Unselect}$ to be different from a voltage level applied to the at least one first word line in the additional read operation.

17. The memory system of claim 16, wherein the memory device is configured to perform the main read operation by adjusting the voltage level $V_{N+1_{MR}}$ applied to the upper word line $WL_{N+1}$ adjacent to the upper side of selected word line $WL_N$ among the plurality of unselected word lines $WL_{Unselect}$ and the voltage level $V_{N-1_{MR}}$ applied to the lower word line $WL_{N-1}$ adjacent to the lower side of the selected word line $WL_N$ among the plurality of unselected word lines $WL_{Unselect}$ to be each different from a voltage level $V_{Unselect_{MR}}$ applied to other unselected word lines $WL_{Unselect}$-$WL_{N+1}$-$WL_{N-1}$ except for the upper word line $WL_{N+1}$ and the lower word line $WL_{N-1}$.

18. The memory system of claim 17, wherein the memory device is configured to perform the main read operation by adjusting the voltage level $V_{N+1_{MR}}$ applied to the upper word line $WL_{N+1}$ and the voltage level $V_{N-1_{MR}}$ applied to the lower word line $WL_{N-1}$ to be each greater than the voltage level $V_{Unselect_{MR}}$ applied to the other unselected word lines $WL_{Unselect}$-$WL_{N+1}$-$WL_{N-1}$.

19. The memory system of claim 16, wherein the memory device is configured to perform the additional read operation by adjusting both the voltage level $V_{N+1_{AR}}$ applied to the upper word line $WL_{N+1}$ and the voltage level $V_{N-1_{AR}}$ applied to the lower word line $WL_{N-1}$ adjacent to a to be respectively lower than the voltage level $V_{N+1_{MR}}$ applied to the upper word line $WL_{N+1}$ and the voltage level $V_{N-1_{MR}}$ applied to the lower word line $WL_{N-1}$ in the main read operation.

20. The memory system of claim 16, wherein the memory device is configured to perform the main read operation by applying, to the selected word line $WL_N$, a second select voltage level $V_{Select_{MR}}$ that is different from a first select voltage level $V_{Select_{AR}}$ applied to the selected word line $WL_N$ in the additional read operation, wherein the second select voltage level $V_{Select_{MR}}$ is determined based on an on-chip valley search (OVS) offset voltage $V_{OVS_{OFFSET}}$ and a compensation offset voltage $V_{comp_{OFFSET}}$ that are determined by the additional read operation.

* * * * *